United States Patent
Schultheis et al.

(10) Patent No.: US 12,434,070 B2
(45) Date of Patent: Oct. 7, 2025

(54) ILLUMINATION SYSTEM COMPRISING AN OPTICAL WAVEGUIDE WITH A DIFFUSER ELEMENT, AND METHOD FOR PRODUCING AND/OR STRUCTURING A DIFFUSER BASE BODY AT LEAST PARTIALLY OR IN SECTIONS THEREOF

(71) Applicant: SCHOTT AG, Mainz (DE)

(72) Inventors: Bernd Schultheis, Schwabenheim (DE); Hubertus Russert, Jugenheim (DE); Oliver Keiper, Hünstetten (DE); Martin Cramer, Wiesbaden (DE); Jürgen Meinl, Hohenstein-Holzhausen (DE); Lothar Wilhem Wilmes, Oestrich-Winkel (DE); Jonas Grimm, Bad Schwalbach (DE)

(73) Assignee: SCHOTT AG, Mainz (DE)

( * ) Notice: Subject to any disclaimer, the term of this patent is extended or adjusted under 35 U.S.C. 154(b) by 0 days.

(21) Appl. No.: 16/833,359

(22) Filed: Mar. 27, 2020

(65) Prior Publication Data
US 2020/0222712 A1   Jul. 16, 2020

Related U.S. Application Data

(63) Continuation of application No. PCT/EP2018/076487, filed on Sep. 28, 2018.

(30) Foreign Application Priority Data

Sep. 29, 2017 (DE) ............ 10 2017 122 756.3

(51) Int. Cl.
*A61N 5/06* (2006.01)
*A61B 18/20* (2006.01)
(Continued)

(52) U.S. Cl.
CPC ............ *A61N 5/062* (2013.01); *A61B 18/20* (2013.01); *A61N 5/06* (2013.01); *G02B 6/001* (2013.01);
(Continued)

(58) Field of Classification Search
CPC .......... A61N 5/06; A61N 5/062; A61N 5/067; A61N 2005/063; A61N 2005/0664; A61B 18/20
See application file for complete search history.

(56) References Cited

U.S. PATENT DOCUMENTS 5,219,346 A    6/1993  Wagnieres
5,401,270 A *  3/1995  Muller ............... B23K 26/064
                                                606/17
(Continued)

FOREIGN PATENT DOCUMENTS

CN    103917902    7/2014
CN    106066511    11/2016
(Continued)

OTHER PUBLICATIONS

English translation of International Preliminary Report on Patentability dated Apr. 9, 2020 from corresponding International Application PCT/EP2018/076487, 9 pages.
(Continued)

*Primary Examiner* — Lynsey C Eiseman
*Assistant Examiner* — Skylar Lindsey Christianson
(74) *Attorney, Agent, or Firm* — Ruggiero McAllister & McMahon LLC

(57) ABSTRACT

An illumination system is provided that includes a laser light source and an optical waveguide connected to and/or associated with the laser light source at a proximal end thereof. The illumination system includes a diffuser element at the distal end of the optical waveguide with a longitudinal axis
(Continued)

extending perpendicular to the coupling surface of the optical waveguide into the diffuser element. The diffuser element emits light over its active length laterally of the longitudinal axis and has at a base body with a scattering element. The scattering element is aligned along the longitudinal axis substantially parallel or at an angle thereto. An emission intensity homogenizer along the longitudinal axis is provided. The illumination system exhibits an intensity distribution of lateral emission deviating by at most ±50% from an average lateral emission intensity.

42 Claims, 7 Drawing Sheets

(51) Int. Cl.
*F21V 8/00* (2006.01)
*A61N 5/067* (2006.01)
(52) U.S. Cl.
CPC *A61N 2005/063* (2013.01); *A61N 2005/0664* (2013.01); *A61N 5/067* (2021.08)

(56) References Cited

U.S. PATENT DOCUMENTS

| | | | |
|---|---|---|---|
| 5,431,647 A | | 7/1995 | Purcell, Jr. |
| 5,536,265 A | | 7/1996 | Van Den Bergh |
| 5,989,246 A | * | 11/1999 | Kaufmann ............ A61N 5/0601 606/15 |
| 6,270,492 B1 | * | 8/2001 | Sinofsky .............. A61N 5/0601 606/7 |
| 6,810,184 B2 | | 10/2004 | Skutnik |
| 2009/0204111 A1 | | 8/2009 | Bissig |
| 2011/0040357 A1 | * | 2/2011 | Arai ..................... A61N 5/0601 359/599 |
| 2012/0109264 A1 | * | 5/2012 | Frangineas ......... A61B 18/203 362/311.06 |
| 2013/0088888 A1 | | 4/2013 | Fewkes |
| 2013/0314940 A1 | | 11/2013 | Russert |
| 2014/0376868 A1 | | 12/2014 | Ritter |
| 2015/0016140 A1 | | 1/2015 | Weingärtner |
| 2016/0313506 A1 | | 10/2016 | Agonoglu |
| 2018/0092513 A1 | * | 4/2018 | Melsheimer ....... A61B 1/00096 |
| 2018/0299614 A1 | | 10/2018 | Schwagmeier |
| 2020/0222712 A1 | | 7/2020 | Schultheis |
| 2021/0318494 A1 | | 10/2021 | Schultheis |

FOREIGN PATENT DOCUMENTS

| | | | | |
|---|---|---|---|---|
| DE | 10129029 | | 12/2002 | |
| DE | 69526998 | | 12/2002 | |
| DE | 102012100233 | | 7/2013 | |
| DE | 102012208810 | | 11/2013 | |
| DE | 102013208838 | | 3/2015 | |
| DE | 102015119875 | | 12/2016 | |
| DE | 102018133338 | | 6/2020 | |
| EP | 0437183 | | 7/1991 | |
| EP | 1527798 | | 5/2005 | |
| EP | 2062077 | | 5/2009 | |
| EP | 3184885 | | 6/2017 | |
| EP | 3184885 A1 | * | 6/2017 | .......... C03C 13/045 |
| WO | 9325155 | | 12/1993 | |
| WO | 9607451 | | 5/1996 | |
| WO | 2008024397 | | 2/2008 | |
| WO | WO-2008024397 A2 | * | 2/2008 | ............ G02B 6/262 |
| WO | 2019063799 | | 4/2019 | |

OTHER PUBLICATIONS

English translation of Written Opinion dated Jan. 7, 2019 from corresponding International Application PCT/EP2018/076487, 7 pages.
International Search Report dated Apr. 4, 2019 from corresponding International Application PCT/EP2018/076487.
Finlay, "In vivo determination of the absorption and scattering spectra of the human prostate during photodynamic therapy", Proceedings of Spie, 2004, 12 pages.

\* cited by examiner

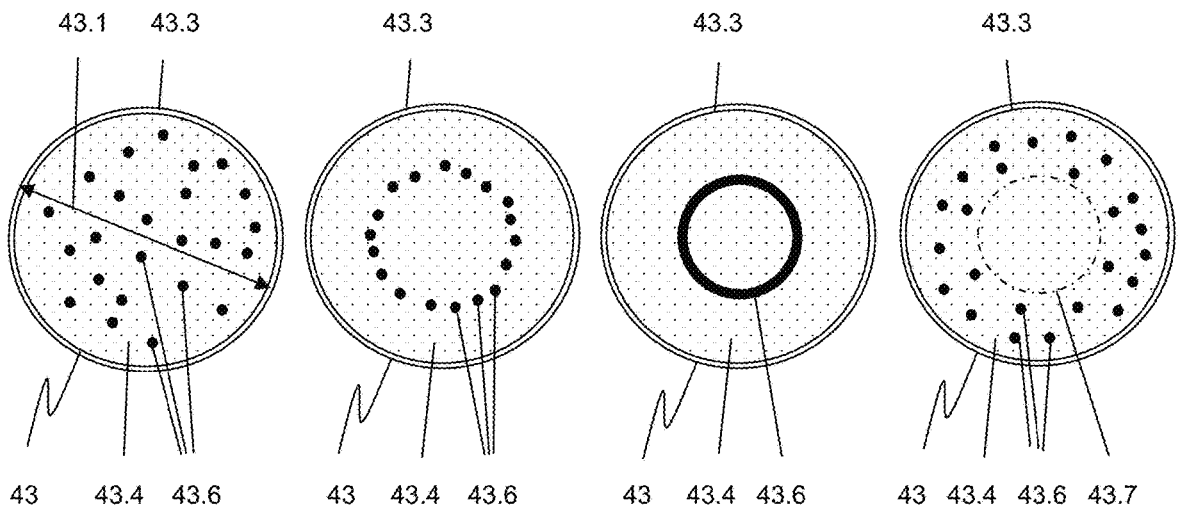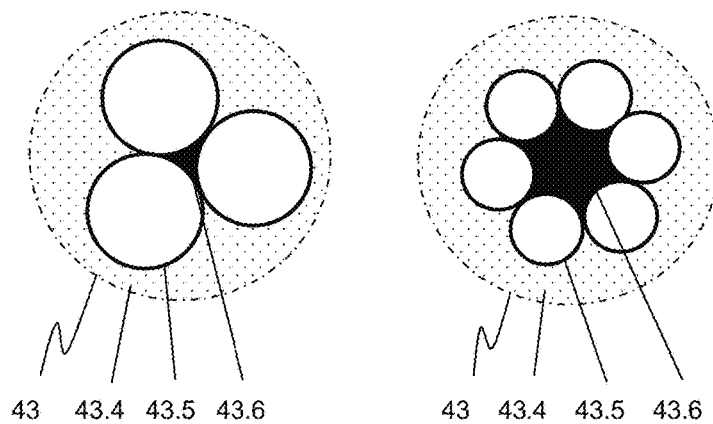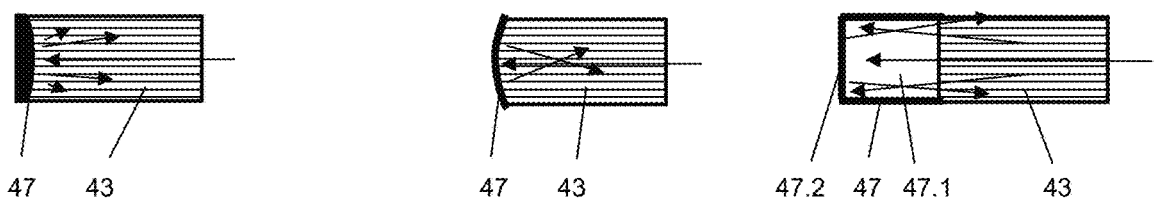

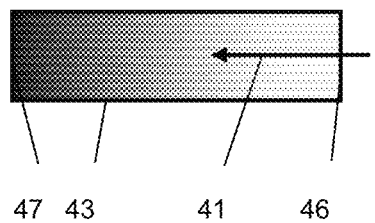
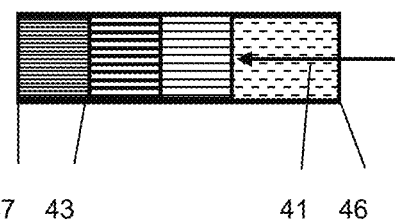
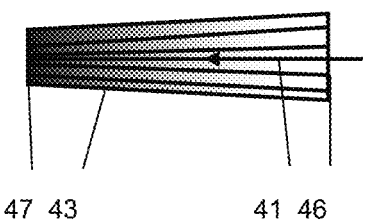
47  43          41     46         47  43              41  46      47 43           41 46
FIG. 6a                FIG. 6b                        FIG. 6c
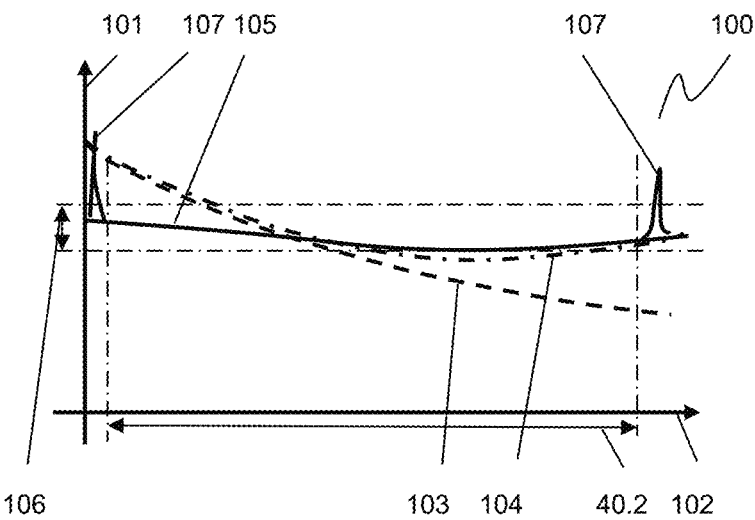
FIG. 7

ILLUMINATION SYSTEM COMPRISING AN OPTICAL WAVEGUIDE WITH A DIFFUSER ELEMENT, AND METHOD FOR PRODUCING AND/OR STRUCTURING A DIFFUSER BASE BODY AT LEAST PARTIALLY OR IN SECTIONS THEREOF

CROSS REFERENCE TO RELATED APPLICATIONS

This application is a continuation of International Application PCT/EP2018/076487 filed Sep. 28, 2018, which claims the benefit of German Application DE 10 2017 122 756.3 filed Sep. 29, 2017, the entire contents of both of which are incorporated herein by reference.

BACKGROUND

1. Field of the Invention

The invention relates to an illumination system, in particular for a medical treatment and/or diagnosis system, and to a method for producing a diffuser base body, in particular for an illumination system, and also relates to a method for structuring a diffuser base body at least partially or in sections thereof, in particular for adjusting the intensity profile of lateral emission.

2. Description of the Related Art

Such illumination systems are increasingly used in the medical sector. The following main fields of application can currently be classified: photodynamic therapy (PDT) for tumor treatment; endovenous laser treatment (EVLT) for treating of varicose veins; laser-induced interstitial thermotherapy (LITT); and other applications, e.g. in the field of dental medicine, ophthalmology, and dermatology.

Photodynamic therapy (PDT) is a minimally invasive therapy option for various cancers. PDT is a procedure for treating tumors and other tissue alterations (such as angiogenesis) using light in combination with a substance that can be activated by light. At the beginning of the treatment, the patient receives an intravenous injection of light-sensitive substances, known as photosensitizers, which accumulate in or on the cancer cells. These natural photosubstances concentrate in the tumor cells and cause a strong sensitivity to light there. For this purpose, the tumor tissue is punctured using a plurality of needles (typically up to 8) during the PDT treatment, and an optical waveguide with a diffuser element is introduced into each of them. The diffuser elements need to be spatially distributed as good as possible across the tumor tissue. Laser light, usually with wavelengths in the visible spectral range, for example green light with 532 nm or red light with 690 nm wavelength, is injected into the diffuser elements via the optical waveguides, so that the tumor tissue is irradiated as evenly as possible from inside, thereby generating aggressive oxygen radicals in these cells, which selectively destroy the tumor cells. In contrast to the diseased cells, the healthy cells remain unaffected by this chemical reaction. The exact mechanism of action is described in "Photodynamic Therapy of Cancer", Cancer Medicine, 2003, inter alia.

A distinction is made here between cylindrical diffusers with typical active lengths of 10 to 50 mm, spot diffusers that generate a forward-facing lighting cone, and point diffusers exhibiting radial light emission. In the case of cylindrical diffusers it is particularly important that lateral emission of the diffuser elements is as homogeneous as possible over the length in the operating state thereof. This should be true both axially, i.e. emission intensity is consistent at all points along every line from the proximal to the distal end in the direction of the longitudinal axis within the scope of homogeneity requirements, and radially, i.e. emission intensity is also consistent at all points along every circumferential line along the longitudinal axis within the scope of homogeneity requirements, so that these diffusers are substantially effective as Lambertian radiators.

At the same time, high scattering efficiency has to be achieved in order to ensure the lowest possible heat input into the tissue. Typical homogeneity requirements for lateral emission specify a maximum deviation of ±10 to 20% from the average intensity, while forward emission, in particular from the distal end, of more than 10%, typically more than 5% of the injected light should be avoided. Laser output power for PDT applications is typically <5 W of continuous power, so that maximal between 100 mW and 1000 mW, typically between 200 mW and 500 mW is emitted per cm diffuser length. This currently allows to use plastic-based diffuser implementations.

Existing examples are diffuser elements made of a thin silicone cylinder with scattering particles in the form of titanium oxide nanoparticles embedded therein. Document DE 10129029 A1 describes a flexible device for thermal obliteration of biological tissue by laser radiation via an optical waveguide, the distal end of which is surrounded by a jacket which is transparent to the laser radiation and which projects beyond the fiber end and is filled with a silicone matrix in its volume located in front of the fiber end, in which scattering particles are embedded, wherein non-scattering particles with diameters of a few nanometers, preferably made of silicon dioxide, are admixed into a plastic matrix preferably made of silicone, with a concentration range of preferably 1-10%, and wherein the distal end of the jacket is sealed by an end piece that is transparent or opaque for the laser radiation.

However, manufacture thereof with sufficient emission homogeneity is very complex and costly. Conglomerates of the scattering particles often form emission spots with an intensity significantly above the average.

Such optical waveguides with diffuser elements are usually used only once and are disposed of after each treatment. Therefore, there is also a certain cost pressure when it comes to manufacturing costs. Accordingly, reusable solutions are increasingly being considered. Such solutions must then allow to be reconditioned in compliance with the relevant known standards, i.e. they have to be disinfectable and/or sterilizable. Preparation processes that should be mentioned here include in particular cleaning and disinfection processes with strongly basic solutions and sterilization by autoclaving at temperatures of up to 135° C. and typical steam pressures of about 3 bars. Typically, tens to several hundreds of such processing cycles are then assumed. This implies high requirements on thermal, chemical, and also hydrolytic resistance. Therefore, optical waveguide and diffuser implementations made of glass or fused silica fibers are particularly suitable in this case.

In EVLT, the attending physician introduces a catheter into the affected vein via a tiny puncture site, which catheter serves as a guide rail for the vein laser. The inner wall of the vessel is then heated by targeted lateral emission of the laser energy by means of the diffuser, whereby the vein collapses and is sealed. Pathological reflux of the venous blood is prevented in this way. As a result, the vein hardens, regresses, and can be broken down by the body. Currently, emission elements known as ring or double ring fire systems are usually used for this purpose. The laser light is emitted radially in the form of a relatively sharply delimited ring or double ring light to the tissue surrounding the vein, while, for uniform treatment, the optical waveguide with the emitting element is often manually pulled through the vein section to be treated at a constant rate, which complicates the application, since further cell damage may be caused at locations in the case of non-compliance or excessive dwell time.

A cylindrical diffuser of the kind used in PDT applications would bring advantages here. However, EVLT treatment requires significantly higher laser output powers. For example, laser power is typically between 10 and 50 W at wavelengths in the NIR range, i.e. between about 800 nm and 1480 nm, which is currently provided using diode lasers (e.g. 810 nm, 940 nm, or 1480 nm) or Nd:YAG lasers (1064 nm). Meanwhile, longer wavelengths of about 2 µm have also become established for EVLT treatment. In this case, Tm:YAG lasers (1.9 µm) and Ho:YAG lasers (2.1 µm) are used, for example. Due to the absorption properties of tissue, lower laser output powers of typically <10 W are required at these wavelengths. However, optical waveguides made of fused silica are mandatorily used here already, in particular for supplying the laser light.

The homogeneity requirements on lateral emission of diffusers which can be employed for EVLT are less high compared to those of a PDT application and can amount to a maximum deviation of ±30% to ±50% from average intensity.

LITT is a minimally invasive procedure that is used for local tumor destruction. The tumor is punctured under visualization (e.g. sonography/MRI), one (or more) laser fiber(s) are introduced into the focus of the tumor, and scleroses is induced in the latter by thermal energy. In particular Nd:YAG lasers (1064 nm) and diffuser tip applicators are used in this case. Laser output power is about 5 to 8 W (cf. "Laserinduzierte Interstitielle Thermotherapie (LITT) bei malignen Tumoren" BÄK and KBV January 2002, inter alia).

Further diffuser implementations are known from the documents mentioned below and can be divided into four categories: volume scattering diffusers, fibers with applied scattering particles, diffusers produced by laser processing, and diffusers formed from side-emitting fibers.

Volume scattering diffusers are disclosed in document EP 3,184,885 A1, for example, which describes a diffuser at the end of an optical waveguide made of fused silica, and for producing the diffuser, a scattering mass is applied to the distal fiber end of the optical waveguide and is solidified to form the diffuser. The application of the scattering mass comprises the steps of (a) providing $SiO_2$ grains containing amorphous $SiO_2$ particles and consisting of at least 90 wt % of $SiO_2$; (b) providing a hollow body made of glass having a cavity wall surrounding a cavity that opens to the outside; (c) providing a bed of $SiO_2$ grains in the cavity and introducing the fiber end into the cavity so that at least a portion of the fiber end protrudes into the bed; (d) thermally compressing the bed to form a porous sintered mass consisting to at least 90 wt % of $SiO_2$, which is at least partially surrounded by a glass jacket. A drawback of such approaches is that such volume scattering implementations imply a strongly exponential decrease in intensity. Moreover, porous materials are not preferred in medical technology applications with regard to their processability.

U.S. Pat. No. 6,810,184 B2 describes an approach in which nanoporous silica clad optical fibers are used to make fibers having integrally formed diffusion tips and diffusion tips that can be fused to other fibers. The disclosed diffusers can be fabricated to be cylindrical with the light diffusing along the length thereof, spherical with light radiating outwardly in a spherical pattern, or custom shaped to illuminate irregular surfaces or volumes. Gradient and step index properties can also be achieved.

Documents EP 2062077 A4, US 2009/0204111 A1, and DE 102015119875 A1 disclose diffusers which are produced by introducing structures into or applying structures onto the fiber using lasers.

Documents EP 2062077 A4 and WO 2008/024397 A2 disclose, e.g., a diffuser for outputting optical energy of high power density to a treatment site at the distal end of at least one optical fiber, wherein the diffuser comprises a section of predetermined length of the distal end of at least one optical fiber and scattering centers positioned in this section of predetermined length at the distal end of the optical fiber, the scattering centers causing a portion of the inputted optical energy to exit radially onto a treatment site. It is contemplated that the scattering centers are located in this predetermined length of the fiber core or in or near an interface between the fiber core and the cladding in this predetermined length. The scattering centers are defects in the fiber core, such as nanocracks or nano-voids creating localized refractive index differentials in either the core or in or near the interface between the core and the cladding. The scattering centers may be scattering particles included within the core or the cladding of this core. Besides the complex introduction thereof which is moreover difficult to control, for example with regard to the distribution and/or size of the aforementioned nanocracks or nano-voids, the latter may also have a negative impact on the susceptibility to breakage of the component. Furthermore, in all approaches it has to be expected that the required homogeneity of lateral emission will not be achieved, either due to the exponential decay in lateral emission in the case of a sufficiently homogeneous design, or due to uneven distributions.

Document US 2009/0204111 A1 describes a laser delivery system comprising an optical fiber having (i) a core and a cladding layer that covers at least a portion of the core, wherein the cladding layer has a lower refractive index than the core; and (ii) a non-feature portion and a feature portion having features that force light to couple out radially from the feature portion and provide a desired radial light output pattern. It is contemplated that the features are selected from the group consisting of threads, radial cuts, axial cuts, and a combination thereof.

DE 102015119875 A1 discloses an optical waveguide comprising an optical wave-guiding core, a region in the optical waveguide in which micro-modifications are arranged in the region of the optical waveguide, wherein the micro-modifications are arranged in an ordered arrangement. The method for introducing the micro-modifications into optical waveguides comprises the steps of (a) affixing an optical waveguide in a holder, the optical waveguide and/or the holder being mounted in a movable manner; (b) focusing high-energy radiation onto a focal position, the focal position being positionable in the interior of the optical waveguide, the radiation being generated by a radiation source in pulsed operation, and the focusing apparatus for focusing the high-energy radiation being mounted in a movable manner; and (c) moving the focal position through the optical waveguide, wherein the movement of the focal position in the interior of the optical waveguide is selected in a manner dependent on the repetition rate.

Document DE 10 2012 208 810 A1 of the present applicant discloses a side-emitting glass element comprising a plurality of light guiding elements made of a glass having a refractive index $n_1$ and being inseparably connected to one another at their outer circumferential surfaces, and at least one scattering element inseparably connected to the outer circumferential surface of at least one light guiding element so that, when light is guided in the glass element, a portion of this light is laterally emitted from the glass element, wherein the individual light guiding elements are not individually enclosed by a cladding glass having a refractive index differing from $n_1$, and wherein a phase boundary is present between the light guiding elements. This document furthermore discloses a method for producing such a side-emitting glass element, comprising the method steps of (i) providing a plurality of fiber-optic rods made of a glass having refractive index $n_1$; (ii) arranging at least one scattering rod made of a glass comprising scattering centers among or within the plurality of fiber-optic rods such that the axes of the fiber-optic rods and of the at least one scattering rod extend at least substantially parallel to one another so as to obtain a preform; (iii) heating the preform; (iv) drawing the preform to form a side-emitting glass element such that the outer circumferential surfaces of the fiber-optic rods combine inseparably with one another and with the at least one scattering rod. The approaches described therein are in particular used for decorative illumination purposes, for which in particular a radially directed emission effect is desired to be achieved.

SUMMARY

Therefore, an object of the invention is to provide a cost-effective solution for the manufacturing and use and repeated usability of diffusers, in particular for cylindrical diffusers, and for related illumination systems. Furthermore, they should meet the aforementioned homogeneity requirements for lateral emission based on the average intensity of lateral emission and should overall exhibit Lambertian emission behavior, in particular for PDT applications on the one hand, and on the other should meet the requirements with regard to their compatibility with high power densities, in particular in EVLT applications. The approach described in DE 10 2012 208 810 A1 represents a basic technology which should advantageously be optimized it with regard to the provision of such diffusers.

For this purpose, an illumination system is disclosed, in particular for a medical treatment and/or diagnosis system, comprising at least one laser light source and an optical waveguide which can be connected to and/or associated with the at least one laser light source at a proximal end thereof, and comprising a diffuser element at the distal end of the optical waveguide, the diffuser element having a longitudinal axis extending perpendicular to the coupling surface of the optical waveguide into or in the diffuser element; wherein the diffuser element, in its operating state, emits light over its active length laterally of the longitudinal axis; wherein the diffuser element comprises at least one diffuser base body and the diffuser base body includes at least one scattering element, wherein, preferably, the at least one scattering element is aligned along the longitudinal axis of the diffuser base body substantially parallel thereto or is arranged at an angle to the longitudinal axis of the diffuser base body; and wherein means for homogenizing the emission intensity along the longitudinal axis of the diffuser base body are provided at the distal end of the diffuser base body and/or surrounding the transition area between the optical waveguide and the diffuser base body and/or the diffuser base body itself at least partially or in sections thereof; wherein in its operating state, the illumination system exhibits an intensity distribution of lateral emission that deviates by not more than ±50%, preferably by not more than ±30%, and most preferably by not more than ±5% from the average lateral emission intensity.

In the context of the present disclosure, lateral emission refers to an emission which has directional components emanating from the longitudinal axis of the diffuser base body and extending in the radial direction. Lateral emission intensity refers to the intensity of this emission.

The object can furthermore advantageously be achieved by having at least one scattering element arranged along the entire longitudinal axis of the diffuser base body with a uniform cross-sectional shape substantially parallel thereto, or, in the case of tapering diffuser base bodies at an angle to the longitudinal axis. The at least one scattering element may advantageously also be tubular and may in particular be arranged coaxially to the longitudinal axis.

A plurality of scattering elements may be arranged in a specific predeterminable geometric arrangement around the longitudinal axis of the diffuser base body, preferably in a regular pattern, most preferably a circular pattern around the longitudinal axis. A plurality of scattering elements that are arranged at an angle therefore preferably intersect at a vanishing point outside the diffuser base body.

Means and/or measures for homogenizing the lateral emission along the longitudinal axis are preferably provided at the distal end of the diffuser base body and/or in the transition area between the optical waveguide and the diffuser base body, which enclose the diffuser base body at least partially or in sections thereof and/or substantially completely.

For example, such means include sleeves, covers, caps, and/or layers at the distal end of the diffuser in order to prevent forward emission from the distal end, and to reflect it back and thus make it again available for the scattering processes in the diffuser base body and on the other hand to avoid stray light effects and/or light reflections at the distal end of the diffuser base body.

The same applies to the transition area between the optical waveguide and the diffuser base body. Stray light effects and/or light reflections may occur here, too, which can be suppressed by appropriately effective elements such as sleeves and/or layers at this location.

The optical waveguide may comprise a single fiber, for example a mono-mode or multi-mode optical fiber comprising a core with a core diameter and a cladding, or may comprise a fiber bundle having a fiber bundle diameter.

This makes it possible to provide reproducible and also cost-optimized diffuser elements that exhibit homogeneous emission in their operating state, for medical treatments as mentioned in the introductory part.

According to a preferred implementation variant it is contemplated that the scattering elements in the diffuser base body are arranged in a radially evenly distributed pattern around the longitudinal axis of the diffuser base body, while a core zone around the longitudinal axis has no or a significantly reduced number of scattering elements per unit area compared to the number of scattering elements per unit area outside the core zone, so that the scattering elements are predominantly arranged outside this core zone within the matrix. This ensures that the injected light which is usually injected with a small NA (<0.3, typically about 0.2) will not immediately be scattered on the scattering elements. On the other hand, the core zone which is virtually free of scattering elements allows enough light to propagate to the distal end of the diffuser base body without being scattered. This allows to reduce the intensity near the injection site (proximal end of the diffuser base body) on the one hand, and on the other hand to increase the intensity near the distal end of the diffuser base body.

According to a further preferred implementation variant, it may be contemplated that the diffuser base body comprises a matrix which has different refractive indices $n_1$ and $n_1'$ with respect to the cross-sectional area thereof, in particular between the core zone and the peripheral zone of the matrix in which the scattering elements are embedded. This allows, for example, to influence the numerical aperture NA within the core zone that has a matrix refractive index $n_1$, and outside the core zone of the matrix with a refractive index $n_1'$. Furthermore, the propagation of the light in the diffuser base body and hence an excitation of the scattering centers can be adjusted to the required emission characteristic over the length of the diffuser. Moreover, any desired cross-sectional geometry of the core zone having the refractive index $n_1$ can be realized during the manufacturing process, i.e., for example, a substantially circular shape, but also a polygonal or star-shaped shape.

Homogenization of the intensity of lateral emission can be promoted if the diameter of the diffuser base body within which the scattering elements are embedded is equal to or larger than a core diameter or fiber bundle diameter of the optical waveguide.

A ratio between the core diameter or fiber bundle diameter of the optical waveguide and the diameter of the matrix of ≤1.0 to 0.7, most preferably of ≤1.0 to 0.8 has been found to be particularly favorable.

A core diameter or fiber bundle diameter that is only slightly smaller than the diameter of the matrix permits to reduce an intensity peak at the injection site (transition area from optical waveguide to diffuser base body).

By contrast, a core diameter or fiber bundle diameter that is significantly smaller than the diameter of the matrix of the diffuser base body, i.e. a ratio of <0.8, may cause a reduction in intensity at the injection site, which may also be advantageous for particular requirements.

It has furthermore been found that, if the ratio is between 1 and 0.9, a particularly robust mechanical coupling or bonding can be achieved between the optical waveguide and the diffuser base body, for example by splicing.

Ideally, the diffuser element has a reflector surface at the distal end of the diffuser base body, namely in the form of a directionally reflecting surface such as a metallic mirroring surface with a metal coating in particular comprising Al, Ag, Au, or a diffusely reflecting surface, for example comprising a white paint layer, which reflects the light that passed through the diffuser base body back into it. This allows to at least partially compensate for or correct the usually exponential decay in intensity of the laterally emitted light along the diffuser base body. The amount of light that can be provided given a constant scattering rate is thus altered or is adjustable at least in sections, so that lateral emission can be homogenized.

Short polished metallic wire sections of approximately 0.5 to 2 mm in length and made of aluminum or gold, for example, which are arranged in direct contact to the diffuser base body and form heat sinks, have proven to be particularly effective reflectors, in particular also to avoid hot spots. Hotspots are locally increased light intensities which in case of absorption at interfaces, for example, lead to undesirable local increases in temperature.

Furthermore, sputter-deposited or vapor-deposited dielectric reflection layers have been found to be particularly advantageous on the distal end of the diffuser base body; they may consist of multiple layers and can be matched to the wavelength of the employed light in terms of reflectivity, which means they may have a maximum at the wavelength to which they are matched. This allows to achieve ideal back reflection of the light injected during the operating state on the one hand, and on the other hand the avoidance of hotspots.

Alternatively, it may as well be contemplated for the reflector to be implemented by a silver layer with rear passivation, which exhibits good broadband reflectivity. Such layers are particularly robust and capable of suppressing disturbing reflections which might lead to locally excessive intensities and also hotspots. In this way, in particular a very broadband reflector can be implemented, which has very good reflection properties both in the visible spectral range (VIS) and in the IR/MIR range, e.g. between 1 μm and 2.5 μm wavelength. Rear passivation prevents oxidation of the silver layer.

If the reflector surface is concave or convex, this allow to cause rays propagating almost parallel to the longitudinal axis to be at least partially reflected back at a steeper angle to the longitudinal axis so as to therefore be scattered more frequently at the scattering elements, so that the output efficiency of lateral emission is increased towards the distal end of the diffuser element, which implies a more homogeneous profile of emission intensity.

The reflector surface can also be in the form of a hollow body or cover or cap closed on one end and having a reflective surface facing the cavity or the transparent body. These may, for example, be cylindrical caps made of plastics, glass, or fused silica, which may be arranged adjoining the distal end of the diffuser base body and which may be designed to be directionally and/or diffusely reflecting at least in sections of at least one surface thereof, for example by having a mirror coating or being provided with a white paint layer. A mirror coating may be implemented as a reflector film or as a reflective coating, for example a vapor-deposited coating.

Also advantageous is a metal cap which then encloses a cavity adjoining the distal end of the diffuser base body. Cavities formed in this way may also be filled with liquid, solid, or solidifying materials, which allows, for example, to adjust refractive indices and/or to bond the cap to the distal end. It may also be contemplated that the caps directly terminate the distal end, without defining a cavity. Particularly advantageously, such caps surround the diffuser base body radially at least partially or in sections thereof over a length of 0.5 to 2 mm, for example. Such elements allow to avoid stray reflections on the one hand, and on the other hand, if there is a cavity, to adjust the numerical aperture of the radiation reflected back into the diffuser base body as a function of the length of the cavity or of the transparent body. Thus, the reflector surface is concave or convex and/or is in the form of a body and/or a cover directly adjoining the diffuser base body or being spaced apart therefrom so as to define a cavity between the reflector surface and the distal end of the diffuser base body, in the form of a hollow body closed on one end.

Metal caps moreover offer the advantage that they may be used as X-ray markers, for example. This allows to visualize the exact position of the diffuser element in the patient's tissue by X-ray-based imaging during an intervention or during treatment. Depending on the imaging technique applied, appropriately designed caps may at least have a similar effect.

In a preferred embodiment, the diffuser element comprises a conjunction zone between the proximal end of the diffuser base body and the distal end of the optical waveguide, which is produced by gluing, splicing, or pressing to form a positive fit and/or material bond and which joins at least the diameter of the diffuser base body to the core diameter or fiber bundle diameter of the optical waveguide.

For matching possibly different thermal expansion coefficients, it may be advantageous to additionally provide an intermediate medium in the conjunction zone between the proximal end of the diffuser base body and the distal end of the optical waveguide. This may be a transition glass or solder glass, for example. On the other hand, this may also be a transparent, permanently elastic adhesive. Furthermore, an optical element may be arranged in the conjunction zone, or the conjunction zone may be designed so as to define an optical element, for example for modifying guidance of the beam and/or the directing of light by geometric adjustment or matching of refractive indices.

To increase mechanical stability, in particular of the joint between the diffuser element and the optical waveguide, it may be advantageous if the conjunction zone is covered by a covering material, for example a sleeve or tubing. The sleeve or tubing may be made from plastics, glass, ceramics, or metal such as nickel silver, titanium, or stainless steel, or alloys so as to be transparent, translucent, and/or opaque and/or reflective, at least in sections thereof. In one case this may be a thin-walled glass sleeve which in particular enhances mechanical stability. Metal sleeves moreover offer the advantage that they may also be used as X-ray markers, for example, which allow to visualize the exact position of the diffuser element in the patient's tissue during an intervention or during treatment. According to one variant it is contemplated that the sleeve is defined by a rigid tube section, for example made of TEFLON®, glass, or fused silica, and/or by flexible tubing, for example a silicone tube. If the tube section and/or the tubing moreover includes scattering centers, this allows to further improve the aforementioned homogenization of the emission characteristic.

A particularly preferred implementation variant for the diffuser element proposes that the diffuser base body with the reflector surface or variants thereof at the distal end as described above and with the conjunction zone comprising the sleeve or variants thereof as described above is provided with a the transparent and/or translucent, dyed or colorless jacket enclosing it at least partially or in sections thereof. On the one hand, mechanical protection can be achieved in this way. On the other hand, the emission characteristic can moreover be further optimized with regard to homogeneity of the intensity of lateral emission by a suitable choice of materials, in particular if they contain scattering centers. This allows, for example, to promote Lambertian light emission.

In a preferred implementation variant, the jacket is at least partially made of one or more thin-walled heat-shrink tubes. On the one hand, such heat-shrink tubes may cause an additional diffuse scattering effect and thus promote Lambertian emission. On the other hand, mechanical protection can be achieved in this way and can prevent possible chipping for the case the diffuser should be damaged. For example a thin-walled heat-shrink tube made of white dyed PET with a wall thickness of about 5 to 15 µm has proven to be suitable for this purpose. In order to suppress reflections, a thin-walled black or colored heat-shrink tube may additionally be provided partially. The coloring may be selected such that the application wavelength is absorbed particularly well. Such heat-shrink tubes are moreover implemented so as to be biocompatible.

In order to compensate, minimize, or prevent any irregularities on the surface(s) of the jacket or of the diffuser base body, such as dirt, particles, roughness, which may cause an undesired inhomogeneous emission in the operating state, an immersion liquid may advantageously be applied or introduced between the diffuser base body and the jacket.

The diffuser base body may substantially consist of a matrix made of transparent plastics, glass, fused silica, or glass ceramics, and the scattering elements embedded therein may, for example, consist of porous or pigmented or for example white dyed plastic in the case of a matrix made of plastics, of pores, particles, porous or pigmented or for example white dyed or inhomogeneities-containing glass or glass ceramic elements and the crystallites contained therein in the case of a glass matrix, of pores, porous fused silica, or ceramic or polycrystalline particles in the case of a matrix made of fused silica, or of pores, particles, porous or pigmented or for example white dyed or inhomogeneities-containing glass or glass ceramic elements and the crystallites contained therein in the case of a transparent glass ceramic matrix. Also, combinations of the scattering elements mentioned by way of example may advantageously be included in the respective matrix. The inhomogeneities of the glass or the glass ceramic which may define the scattering elements in the case of glass or glass ceramic matrix implementations, comprise phase separations, segregations and/or particulate incorporations, seeds, and/or crystallites, for example. The concentration of the scattering elements in the scattering area should be from 10 ppm to 1000 ppm and preferably from 20 ppm to 100 ppm. Here, the concentration value in ppm refers to the proportion of scattering particles in relation to the mass fractions of the constituents of the respective material, in particular the plastic, the glass matrix, or the fused silica matrix in which the scattering particles are embedded. The respective scattering elements defined thereby, i.e. the pores, particles, porous or pigmented or, for example, white dyed or inhomogeneities-containing glass or glass ceramic elements and the crystallites contained therein preferably have a diameter from 10 nm to 1000 nm, most preferably from 100 nm to 800 nm.

A plastic-based implementation of the diffuser base body made from PMMA, PET, or PC plastic rods, for example, can already be implemented at low processing temperatures during manufacturing or reshaping thereof. However, diffuser base bodies made in this way exhibit rather low thermal resistance and are therefore suitable rather for applications with low laser power. Furthermore, they are only suitable for applications in the visible spectral range (VIS), since plastics generally exhibit high absorbance in the NIR and IR range.

Glass-based implementation are much more robust in this respect and above all are thermally stable, so that greater laser output powers can be applied. Suitable components that come into consideration for making the diffuser base body include, for example, glass rods made of N-BK7, optical boron crown glass of the present applicant, borosilicate glass, or Pb-free or heavy metal-free glasses as used for the core glass of high-quality optical glass fibers for example for endoscopes or dental wands used for curing dental fillings, inter alia. The latter enable to meet future RoHS requirements. Such glasses are described in DE 10 2012 100 233 A1 and in DE 10 2013 208 838 B4 of the present applicant.

Examples of such glasses for fiber-optic rods and for the matrix of the diffuser base body from the range of lead-free tin silicate glasses or alkali zinc silicate glasses contain the following constituents (specified in percent by weight on an oxide basis):

|  | from | to |
|---|---|---|
| $B_2O_3$ | 0 | 24 |
| $SiO_2$ | 23 | 62.1 |
| $Al_2O_3$ | 0 | 10 |
| $Li_2O$ | 0 | 10 |
| $Na_2O$ | 0 | 18.5 |
| $K_2O$ | 0 | 25.7 |
| BaO | 0 | 57.8 |
| ZnO | 0 | 40 |
| $La_2O_3$ | 0 | 25 |
| $ZrO_2$ | 0 | 10 |
| $HfO_2$ | 0 | 14.2 |
| $SnO_2$ | >0 | 2 |
| MgO | 0 | 8 |
| CaO | 0 | 8 |
| SrO | 0 | 24.4 |
| $Ta_2O_5$ | 0 | 22 |
| $Y_2O_3$ | 0 | 11.9 |
| $Rb_2O$ | 0 | 15 |
| $Cs_2O$ | 0 | 21 |
| $GeO_2$ | 0 | 7.5 |
| F | 0 | 2 |
| $\Sigma R_2O$ | 5 | 20 |
| $\Sigma$ MgO, CaO, SrO, ZnO | 20 | 42 |

The cladding tube which may be arranged around the fiber-optic rod to later form a cladding and/or as a sheathing of the preform, is preferably made of one of the groups 1 to 4 below, containing the respective following constituents (specified in percent by weight on an oxide basis):

|  | Group 1 | Group 2 | Group 3 | Group 4 |
|---|---|---|---|---|
| $SiO_2$ | 70-78 | 63-75 | 75-85 | 62-70 |
| $Al_2O_3$ | 5-10 | 1-7 | 1-5 | 1-10 |
| $B_2O_3$ | 5-14 | 0-3 | 10-14 | >15 |
| $Li_2O$ | 0-2 | 0-1 | 0-3 | 0-2 |
| $Na_2O$ | 0-10 | 8-20 | 2-8 | 0-10 |
| $K_2O$ | 0-10 | 0-6 | 0-1 | 0-10 |
| MgO | 0-1 | 0-5 | 0 | 0-5 |
| CaO | 0-2 | 1-9 | 0 | 0-5 |
| SrO | 0-1 | 0 | 0 | 0-5 |
| BaO | 0-4 | 0-5 | 0 | 0-5 |
| F | 0-1 | 0-1 | 0 | 0-1 |
| Cl | 0-1 | 0-1 | 0 | 0-1 |
| $Fe_2O_3$ | 0-2 | 0-2 | 0-2 | 0-2 |

In principle, it is also possible to use an X-ray opaque glass or a respective transparent glass ceramic for the diffuser base body or for the embedded scattering elements and/or for a cladding tube. This has the advantage that the diffuser base body as a whole is visualized in the X-ray image at least partially or in sections, so that the position of the diffuser in a patient's body can be determined.

With regard to application wavelengths from 0.8 μm to about 2.2 μm, for example for the EVLT applications mentioned in the introductory part, it is also possible to use special IR-transparent glasses such as those known under the designations N-PK52a, i.e. a phosphate crown glass, or IRG7, i.e. a lead silicate glass of the present applicant.

With an approach based on fused silica it is in particular possible to address applications in the UV and/or IR range up to about 2.5 μm wavelength, if the fused silica has particularly few OH groups. Another advantage that can be mentioned here is the extremely high thermal resistance and the very low intrinsic absorption of fused silica, which in particular allows for a higher laser output power of up to 50 W in application. In addition to scattering elements made of porous fused silica, it is also possible to use scattering elements made from or comprising ceramic pigments such as titanium dioxide, zirconium oxide, or aluminum oxide. Diffuser base bodies based on fused silica can be spliced particularly well to optical waveguides made of fused silica fibers, the fused silica fibers consisting of a core and a cladding which differ slightly in their refractive indices. The cladding may also be made of organic materials such as fluoroplastics, PMMA, or polyimide. However, the manufacturing process of the diffuser base bodies require significantly higher drawing temperatures than are required for glass-based approaches.

Glass ceramic-based implementations for the diffuser base body and/or the scattering elements may be made from a transparent aluminosilicate high-quartz solid solution glass ceramic as is used for fireplace panes or cooking surfaces, for example, which is extremely thermal shock resistant and exhibits high spectral transmittance down to about 2.5 μm. Suitable scattering elements include, for example, a keatite glass ceramic which can be produced from the high-quartz solid solution glass ceramic by a suitable heat treatment process. Furthermore, cordierite glass ceramics or magnesium aluminum silicate glass ceramics are suitable as diffuser base bodies and/or scattering elements.

A diffuser base body that is particularly preferred with regard to its manufacturing process is resulting when the diffuser base body is fabricated from fiber-optic rods made of borosilicate glass rods, tin silicate glass rods, or alkali zinc silicate glass rods, and the scattering elements are made from white glass rods, enclosed by a cladding tube made of borosilicate glass, tin silicate glass, or alkali zinc silicate glass to form the preform.

In one refinement of the invention, both the diffuser base body and the cladding tube may be made of the same type of glass. The refractive index of the cladding tube is preferably not greater than that of the matrix glass, and most preferably the two refractive indices are equal. This promotes the emission of the light scattered in the diffuser.

This allows for cost-effective processes for the fabrication of diffusers which can be obtained in nearly any length with a homogeneous emission intensity. Furthermore, such diffusers may also be adapted to a particular application in terms of further geometric parameters, such as their diameter, and can be used as semi-finished products which may later be cut to length and optionally post-treated for a particular application case.

In order to comply with a predefined tolerance band for the intensity profile or homogeneity of the radiation laterally emitted over the length of the diffuser element or diffuser base body in the operating state, it may be necessary for the diffuser base body to be made from portions of the preform drawn to the diameter of the diffuser base body in the drawing process, and the diffuser base body may be composed of a plurality of portions and the portions may be made from different preforms including a different number and arrangement of the scattering elements. The diffuser portions may be combined by splicing or gluing using a refractive index matched adhesive to form a diffuser base body, and in one embodiment the scattering effect is advantageously the lowest in the first diffuser portion into which the light is injected. The scattering effect then increases in the individual downstream diffuser portions in the direction of light propagation in the diffuser base body. In this way, it is possible for the intensity of lateral emission in the operating state to be kept consistent within a tolerance band.

At least a partial compensation for the usually exponential decay in intensity may furthermore be achieved if the portions of the diffuser base bodies are subjected to a heat treatment, in particular a gradient heat treatment following the drawing process. Such gradient heat treatment makes it possible to have a subsequent effect on the scattering elements along their length of extension in the diffuser base body with regard to the scattering effect thereof. For example, a segregation process in the white glass rods used as scattering elements can be varied with such a gradient heat treatment. In the case of glass ceramic-based scattering elements it is possible to influence crystal formation and crystal growth as well as the crystallite size and distribution thereof along the longitudinal axis of the diffuser base body.

In order to reduce undesired scattering, stray light effects, and/or light reflections in particular in the transition area from the optical waveguide to the diffuser base body or at the distal end of the diffuser base body, it may be contemplated according to a further preferred implementation variant that the scattering elements exhibit a reduced scattering effect at the proximal end in close proximity to a coupling surface of the diffuser base body and/or at the distal end in the immediate proximity to the reflector surface compared to the scattering effect along the diffuser base body. This may for instance be achieved by an additional exposure to heat, for example during the process of splicing of the proximal end of the diffuser base body and the optical waveguide. For example, a local segregation (e.g. phase separation, devitrification) existent in white glass rods that are used as scattering elements can be modified at least partially, for example reduced or even reversed in this way. The latter will reduce the scattering effect in this area. Also, the distal end of the diffuser base body may be heated and can be reshaped thereby, for example into a convex and/or at least rounded shape. Additionally, the devitrification which causes scattering may also be altered at least partially and may, for example, even be undone. In this case, too, a reduction of unwanted scattering manifesting itself as hotspots in this area can be achieved by this additional heat treatment process.

A further at least partial compensation for the drop in intensity of the light emitted laterally in the operating state can be achieved if the diffuser base body is drawn into a conical shape, at least partially or in sections thereof, during the drawing process by varying the drawing rate, drawing temperature, and/or drawing force, for example, so that, after a cutting process, diffuser base bodies are obtained which taper at least partially or in sections thereof. For example conically tapering diffuser base bodies are obtained, which due to the taper cause angular spreading of the light beams so that the light travels a greater distance and therefore stronger scattering is caused in the longitudinal direction of the diffuser base body. The scattering elements which are otherwise arranged parallel to the longitudinal axis when producing the preform, do not extend parallel to the longitudinal axis of the diffuser base body anymore within the range of the taper, but at an angle thereto so as to ideally intersect in a common vanishing point.

In addition, further subsequent processes can advantageously be carried out, in which the intensity profile of lateral emission of the diffuser base body and/or the diffuser element can be corrected or adjusted.

These include in particular processes which, on the one hand, allow to modify properties of a material within the volume and/or at the surfaces thereof at least locally, for example the refractive index, and/or composition thereof, for example in the form of colloidal segregations and/or nucleation and/or crystallization, and/or on the other hand allow for material removing or material depositing modifications in almost any geometric shape and arrangement. These include, for example, laser processing techniques which allow to introduce modifications in refractive index or to create structures in the volume such as cavities, and/or in the surfaces, for example by using short-pulse or $CO_2$ lasers.

Furthermore, printing processes can be employed for applying or creating structures, for example a grid pattern on the surface of the diffuser base body and/or of the diffuser element, for example using printable organic or ceramic inks including appropriate pigments, or using a glass flux-based ink, optionally with a respective subsequent heat treatment. Also feasible are photolithographic techniques and processing steps such as those used for instance especially for volume or surface structuring of photosensitive or photostructurable glasses and glass ceramics, for example. Furthermore, wet or dry chemical etching, optionally selectively, of the diffuser base body and/or of the diffuser element on surfaces thereof is also possible, and photolithographic processing steps may also be employed in this case. Mechanical and/or abrasively effective processes such as grinding, lapping, or sandblasting may also be employed for structuring, in particular for roughening a surface of the diffuser base body and/or of the diffuser element.

The proposed exemplary techniques or processes may also be used in combination. The diffuser elements and/or the diffuser base bodies that can be produced in this way will therefore have structures in their volume and/or at their surfaces at least partially or in sections thereof.

According to a further advantageous implementation variant, it may be contemplated that the diffuser base body has a coating that includes scattering particles, at least partially and/or in sections thereof, and/or that the diffuser base body has an additional further jacket made of dyed glass or a dyed plastic, at least partially and/or in sections thereof. Examples of such a coating which additionally promotes a Lambertian emission characteristic and in particular reduces forward directed emission, in the direction of light injection, is a boron nitride (BN) coating. Other coatings of this type may be made of titanium oxide, calcium carbonate, or zirconium oxide, for example.

The additional jacket may, for example, be implemented as a white glass tube which includes scattering elements in its glass matrix.

For example, a colored glass tube may be provided as an additional jacket in the conjunction zone in the proximity of the joint or in the proximity of the intermediate medium between the diffuser base body and the optical waveguide, and the coloration and intensity thereof can be chosen such that in particular the employed light wavelength is suppressed or even blocked.

This can be employed to suppress unwanted reflections and hence undesired side emission. Appropriate jackets made of plastics include dyed silicone or PTFE tubing, for example. In a further variant, it may be contemplated, in particular for suppressing forward directed emission at the distal end of the diffuser, to splice a dyed glass rod to the diffuser base body or to the cladding tube thereof, which absorbs the wavelength of the light. Similar dip coatings made of silicone or appropriate plastics may also be used advantageously.

The fabrication of a diffuser base body according to the invention with an illumination profile adapted to the intended use, in particular with homogeneity of the intensity of lateral emission in the operating state, is a significant challenge. Therefore, the method for producing a diffuser base body according to the invention is also an advantageous further aspect of the invention.

A method for producing a diffuser base body is specified, in particular for an illumination system as described above, which comprises at least one scattering element, wherein the at least one scattering element is preferably aligned along the longitudinal axis of the diffuser base body substantially parallel thereto or is arranged at an angle to the longitudinal axis of the diffuser base body, comprising the method steps of: providing a plurality of fiber-optic rods made of a glass having the refractive index $n_1$ and/or $n_1'$; arranging the plurality of fiber-optic rods having the refractive index $n_1$ and/or $n_1'$ and at least one scattering rod made of a glass or a glass ceramic comprising scattering centers such that the longitudinal axes of the fiber-optic rods and of the at least one scattering rod extend at least substantially parallel to one another to obtain a preform; heating the preform; drawing the preform to form a diffuser base body so that the outer circumferential surfaces of the fiber-optic rods inseparably bond to one another and to the at least one scattering rod to form a positive fit, in particular fuse to one another, so as to form the matrix of the diffuser base body including at least one scattering element formed from the at least one drawn scattering rod embedded therein and/or adjoining thereto.

Thus, a plurality of fiber-optic rods are provided, which are made of a glass having the refractive index $n_1$ or $n_1'$. Depending on the illumination profile to be achieved, at least one or a plurality of scattering rods are provided in a required number, which are made of glass or glass ceramic and include the described scattering centers, and are arranged adjacent to or between the fiber-optic rods, so that an arrangement of fiber-optic rods and scattering rods is created in which the longitudinal axes of fiber-optic rods and scattering rods are advantageously arranged substantially parallel to one another. The scattering rods may be distributed within the arrangement according to a pattern which is dependent on the desired illumination profile. This arrangement is fixed by suitable means and thus forms a preform.

In a subsequent method step, the preform is heated and drawn to form a laterally emitting glass element, so that the fiber-optic rods and the at least one scattering rod inseparably bond to one another at their outer circumferential surfaces. Temperature control during drawing is effected such that a phase boundary is maintained between the optical waveguide elements. This may in particular be achieved by keeping the drawing temperature below the melting temperature of the glass of the fiber-optic rods so that they sinter together, in particular at the sintering temperature. Complete fusion of the fiber-optic rods is avoided according to the invention. The preferred positive fit of the fiber-optic rods and, if desired, of the scattering elements as well is also achieved by the temperature control. The glass element obtained in this way may directly define the diffuser base body. However, it is in particular also possible for the diffuser base body and/or portions thereof to be obtained by cutting to size, for example cutting to length the produced glass element. The matrix of the diffuser base body is defined by the drawn fiber-optic rods joined together with a positive fit, and embedded therein the at least one scattering element including the scattering centers, which has been formed from the drawn scattering rods, also with a positive fit, substantially according to its arrangement within the preform.

In an advantageous embodiment, the fiber-optic rods are not completely fused together, as mentioned above, nor is the scattering rod completely fused to at least one of the fiber-optic rods. Thus, a phase boundary may exist between the scattering rod and the fiber-optic rods as well and will therefore be maintained in the so formed matrix and the scattering elements of the diffuser base body. This embodiment can be achieved when the softening temperature of the glass of the fiber-optic rods is equal to or lower than the softening temperature of the scattering rods.

A likewise advantageous embodiment contemplates that the fiber-optic rods are not completely fused together and that there is a phase boundary between them, but that the at least one scattering element is fused to at least one fiber-optic rod. This can be achieved by choosing the softening temperature of the glass of the scattering rods to be lower than that of the glass of the fiber-optic rods. A softening temperature of the glass of the scattering rods that is lower by up to 50 K, in particular by up to 30 K has proven to be advantageous.

When being drawn, the fiber-optic rods become the matrix and the scattering rods become the scattering elements of the glass element. The fiber-optic rods therefore consist of a glass having a refractive index $n_1$ and are not individually enclosed by a cladding glass having the refractive index $n_2$.

The means for fixing the preform arrangement including the fiber-optic rods and scattering rods may be clamps, for example, which are subsequently removed. Preferably, however, a cladding tube is used, which consists of a glass having the refractive index $n_2$. In this embodiment, the arrangement of fiber-optic rods and scattering rods is combined inside the cladding tube. The cladding tube is most preferably closed on one end. The cladding tube encloses the preform described above at least along the outer circumference thereof. During heating and drawing, the cladding tube softens and comes to engage on the arrangement of fiber-optic rods and scattering rods, so that a cladding is formed around the glass element. The product obtained by the heating and drawing may also be cut and/or further processed in order to obtain the diffuser base body.

By varying the rate, temperature, and/or force parameters during the drawing process of the preform, it is possible to obtain conical diffuser base bodies tapering at least partially or in sections thereof, optionally after having been cut to size. At least within the range of a taper, the scattering elements do no longer extend parallel to the longitudinal axis of the diffuser base body, but at an angle thereto.

Furthermore, advantageously, a method is specified for structuring, at least partially or in sections thereof, a diffuser base body that comprises at least one scattering element, in particular for adjusting the intensity profile of lateral emission thereof, wherein the at least one scattering element is preferably aligned along the longitudinal axis of the diffuser base body substantially parallel thereto or is arranged at an angle to the longitudinal axis of the diffuser base body, and/or a diffuser element; wherein the diffuser base body with the reflector surface and the conjunction zone is at least partially or in sections thereof enclosed by a transparent or translucent jacket to form the diffuser element; wherein the jacket is preferably defined by a rigid tube section and/or by flexible tubing, wherein the tube section and/or the tubing preferably include scattering centers which modify the properties and/or composition thereof in the volume and/or at the surfaces at least locally, and/or form structures of virtually any desired geometrical shape and arrangement therein and/or thereon by material removing or material depositing techniques, comprising laser processing techniques, in particular using short-pulse or $CO_2$ lasers which preferably introduce modifications in refractive index and/or composition or create structures within the volume and/or at the surfaces; printing techniques for applying or producing in particular a grid structure using printable organic or ceramic inks containing appropriate pigments or using a glass flux-based ink; wet chemical or dry chemical etching techniques; photolithographic processes; abrasive mechanical processing techniques; or a combination of these techniques.

A preferred application for the illumination system as described above in its various implementation variants is the use thereof in photodynamic therapy (PDT), for example for tumor treatment, for endovenous laser treatment (EVLT), for example for the treatment of varicose veins, for laser-induced interstitial thermotherapy (LITT), or for applications in the field of dental medicine, ophthalmology and dermatology, as described in the introductory part. In the field of dental medicine, in particular applications for wound or periodontal treatment are worth mentioning here. Moreover, there are applications in brain research in which individual areas of the brain can be stimulated by light so as to treat disease symptoms.

Another application for the illumination system as described above in its various implementation variants is the use thereof in photodynamic therapy (PDT) for tumor treatment, wherein at least one optical waveguide with the diffuser element captures light emitted from other diffuser elements to forward it via the optical waveguide to a detector for spectroscopic analysis. In this case, light capturing diffuser-optical waveguides are applied to the patient in addition to the diverse light emitting diffuser-optical waveguides, and response to the PDT treatment can be assessed on the basis of the spectral differences between injected light and captured light (cf. Finlay et al., Proc. SPIE Int. Soc. Opt. Eng. 2014 Jun. 14; 5315: Page 132-142).

In addition, applications in the industrial sector are also advantageous, for example for inspecting hard-to-reach places, such as on or in a machine, in which homogeneous illumination is particularly important, or else spectroscopic applications, or in biochemistry, in which biochemical in vitro reactions are stimulated by light.

BRIEF DESCRIPTION OF THE FIGURES

The invention will now be explained in more detail by way of exemplary embodiments illustrated in the figures, wherein:

FIGS. 3a to 3d show different exemplary embodiments for the arrangement of scattering elements in a diffuser base body;

FIGS. 4a and 4b show different exemplary embodiments for scattering elements in a matrix of the diffuser base body;

FIGS. 5a to 5c schematically show different exemplary implementations of a reflector surface of the diffuser base body;

FIGS. 6a to 6c schematically show different approaches for homogenizing an intensity profile;

FIG. 7 shows a profile plot of different schematic intensity profiles; and

FIG. 9 is a cross-sectional micrograph of a polished surface of a diffuser base body according to FIG. 3a;

DETAILED DESCRIPTION

Figure 1:
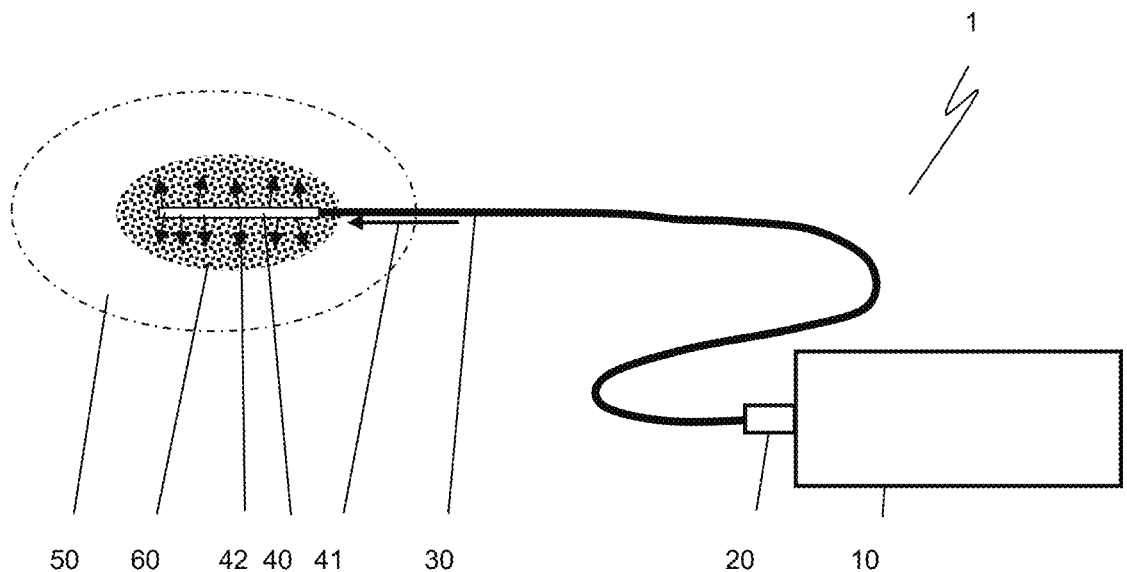
FIG. 1 schematically shows an illumination system comprising an optical waveguide and a diffuser element in a PDT application.

In the following detailed description of embodiments, the same reference numerals in the accompanying figures denote the same or equivalent components.

For a better understanding, definitions are provided as follows.

For the purposes of the present disclosure, the term "illumination system" includes lighting devices and in particular lighting devices which are suitable for use for medical technology purposes and which can be disinfected and/or sterilized at least in sections thereof, in particular insofar as they are intended to come into contact with living tissue.

The wording "for a medical treatment and/or diagnosis system" also encompasses the use or application of the presently disclosed illumination system itself as a medical treatment and/or diagnosis system.

FIG. 1 schematically shows the configuration of an illumination system 1 according to a preferred embodiment of the invention. Here, a medical PDT application is illustrated by way of example.

In the illustrated example, the illumination system 1 comprises a laser light source 10 which emits light in a specific spectral range in its operating state. For PDT applications as described in the introductory part, lasers are used which emit at a wavelength matched to the previously administered biochemically modified dye (photosensitizer), usually in the visible range, for example in the green spectral range at 532 nm, or in the red spectral range, for example at 690 nm.

An optical waveguide 30 is connected to the laser light source 10 via a connector 20 at the proximal end thereof. Here, proximal end refers to the end of the optical waveguide 30 into which light is injected. At its distal end, the optical waveguide 30 has a diffuser element 40 which is introduced, via cannulas (not shown here), into a tumor tissue 60 that formed inside a healthy tissue 50. Here, distal end refers to the other end of the optical waveguide 30, which is usually located remote of the proximal end of the optical waveguide 30 and from which in particular light exits.

The laser radiation gets into the diffuser element 40 through light injection 41 at the diffuser element 40 and is emitted laterally over the length of the diffuser (light output 42). What is important here is that the emission over the length of the diffuser element 40 is as homogeneous as possible. In particular intensity peaks should be avoided. A photo-induced biochemical reaction as described in the introductory part ideally induces necrosis of the tumor tissue 60 after the treatment. Usually, fused silica fibers are used as the optical waveguides 30, and the connectors 20 are usually in the form of coaxial connectors known as SMA connectors, in which the fibers are glued into the connector 20. With regard to thermal resistance, connectors 20 with nickel silver sleeves may furthermore be advantageous, in which the optical waveguide 30 is accommodated, crimped, in the nickel silver sleeve with a positive fit, due to plastic deformation. Moreover, for higher laser output powers, connectors 20 may also be used in which the fiber end of the optical waveguide 30 is protected by a cone prism, which may be advantageous in the case of incorrect adjustments.

Figure 2:
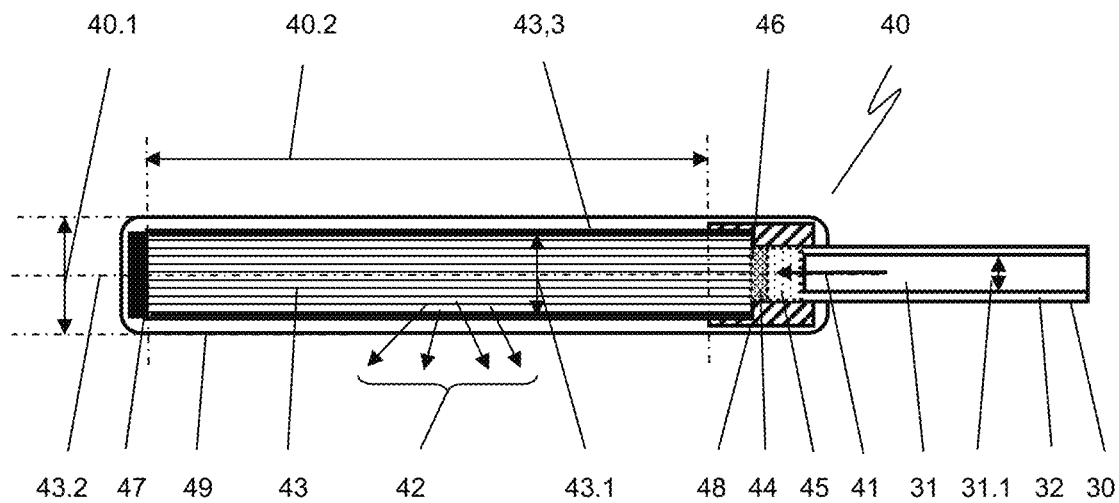
FIG. 2 is a schematic cross-sectional view of the diffuser element.

FIG. 2 schematically shows the configuration of a diffuser element 40 according to a preferred embodiment of the invention.

Diffuser element 40 consists of a diffuser base body 43 which is fixed on the optical waveguide 30 through a conjunction zone 44. In the applications described above, the optical waveguide 30 is mostly made of fused silica comprising a core 31 that has a refractive index $n_1$ and a core diameter 31.1 of usually between 200 and 600 μm, and a cladding 32 that has a refractive index $n_2$, with $n_1 > n_2$. Usually, a numerical aperture NA of approximately 0.22 can be achieved in this way. Light injection 41 is achieved via coupling surface 46 of the diffuser base body 43.

In a preferred embodiment, the diffuser base body 43 with its diameter 43.1 comprises a cladding tube 43.3 and a matrix 43.4 made from matrix elements 43.5 and scattering elements 43.6 embedded therein, or consists of a cladding tube 43.3 and a matrix 43.4 made from matrix elements 43.5 with scattering elements 43.6 embedded therein (not shown here, see FIGS. 3a to 3d, and FIGS. 4a and 4b). In order to be able to meet the homogeneity requirements with regard to the intensity of lateral emission in the operating state, the diffuser base body 43 comprises at least 10 in one embodiment and preferably at least 20 embedded scattering elements 43.6, and preferably comprises not more than 100 thereof, since otherwise the assembling of the preform would be too complex.

The resulting ratio of cross-sectional areas of embedded scattering elements 43.6 to diffuser base body 43 is ≤0.015, preferably ≤0.005, most preferably ≤0.002. The scattering elements 43.6 are aligned substantially parallel to the longitudinal axis 43.2 over the entire length of the diffuser base body 43.

In an advantageous embodiment, the diameter of the diffuser base body 43 is dimensioned to be larger than the core diameter 31.1 or fiber bundle diameter 31.1 of the optical waveguide 30, so that on the one hand no uncontrolled stray light is injected into the cladding tube 43.3, for example. On the other hand, assembly and adjustment of the optical waveguide 30 and the diffuser base body 43 can be simplified and/or assembly tolerances can be compensated for in this way. The ratio of the core diameter 31.1 or fiber bundle diameter 31.1 of the optical waveguide 30 to the diameter 43.1 of the diffuser base body with the embedded scattering elements 43.6 is therefore advantageously ≤1.0, preferably between 1.0 and 0.8. Depending on the desired emission characteristic, a ratio of ≤0.8 may be provided as well.

In the conjunction zone 44 between the proximal end of the diffuser base body 43 and the distal end of the optical waveguide 30, an optical element may be arranged which may have a conical shape, for example in the form of a beam forming element, light guiding element, or fiber-optical taper. This allows for geometrical adjustments, for example of differences in diameters. Here, the proximal end of the diffuser base body 43 refers to the end of the diffuser base body 43, into which light is injected.

To avoid stray light from the conjunction zone 44, but also for mechanical stabilization of the conjunction zone 44, a sleeve 48 is provided made of plastics, glass, metal, or ceramic material, which allows light from the optical waveguide 30 to pass through in the direction of the longitudinal axis of the optical waveguide 30 and under particular lateral angles, but which blocks light that may enter the proximal end of the diffuser body through the lateral surface thereof.

For optimizing the emission characteristic, a reflector surface 47 is provided at the distal end of the diffuser base body 43 opposite the proximal end, which reflector surface may be a directionally reflecting mirror component in the form of a metal plate or a thin mirroring film, for example a carrier film with a vapor-deposited mirror layer or with a coating exhibiting a reflectivity of >95%. A diffusely reflecting layer which is applied by printing a preferably white paint, for example, has also proven to be advantageous.

According to a further implementation variant, it may be contemplated that the reflector surface 47 is defined by short polished wire portions made of aluminum or gold, which are brought into direct contact with the diffuser base body 43. This moreover provides small heat sinks which help to avoid hotspots. Furthermore, sputter-deposited or vapor-deposited dielectric reflection layers consisting of multiple layers and matched to the wavelength of the employed light in terms of reflectivity have been found to be particularly advantageous on the distal end of the diffuser base body 43. In the context of the present disclosure, the wording "matched to the wavelength of the employed light in terms of reflectivity" indicates that the highest possible reflectivity is achieved at this wavelength by this matching, or even that reflectivity is at a maximum at the wavelength matched. One example of such a reflection layer is a multi-layer system consisting of alternately applied $TiO_2$ and $SiO_2$ layers, which, for example, has a reflectivity of >99% in the application wavelength range, e.g. for red light with (690±10) nm. Such layer systems can be appropriately adapted to the respective application wavelength, i.e. matched as mentioned above. In this way, ideal back reflection on the one hand and avoidance of hotspots on the other hand can be achieved. As an alternative or in addition thereto, silver layers with passivation on the rear side may be provided as the reflector surface 47.

For further mechanical protection and/or for homogenizing the emission characteristic, a jacket 49 made of transparent and/or translucent dyed or colorless material (silicone, glass, or fused silica) may be provided, which surrounds the diffuser base body at least partially or in sections thereof. Additional homogenization may be achieved in particular with a translucent material and/or a material containing scattering centers. Respective bodies or tubes made of silicone, Teflon, or else of a polyether block amide block copolymer, such as commercially known as PEBAX® are suitable, for example. A jacket 49 in the form of thin-walled heat-shrink tubes, e.g. made of PET, which are applied at least in sections and may comprise one or more layers has been found to be suitable. Light emission 42 according to a Lambertian radiator is further promoted or achieved in this way. An active length 40.2 of the diffuser element 40 is then resultant as the distance between the sleeve 48 and the reflector surface 47 and may for instance extend over the entire length of the diffuser element 40 or over an active length 40.2 of the diffuser element 40.

Between the diffuser base body 43 and the jacket 49 which is made of glass or plastic, for example, there may be provided an immersion layer between the jacket 49 and diffuser base body 43 for suppressing any surface irregularities such as dirt, roughness, or the like on the diffuser base body 43, which might adversely affect the emission behavior. Attention should be paid to have a refractive index adapted to the glass system, to have high transparency, and to have a sufficiently high viscosity in view of good applicability. For example glycerol or silicones (oils or adhesives) have proven to be suitable as the immersion layer.

To avoid disturbing reflections, it may additionally be contemplated for the reflector surface 47 to be covered by or to be defined by a cover or cap 47.2 surrounding the diffuser base body 43 on the circumferential surface thereof over a short length. In this case, the active length 40.2 corresponds to the distance between the sleeve 48 and this protective cap. If the sleeve 48 or the cap 47.2 are made of metal, a radio marker functionality can be achieved, as the active length 40.2 or the position of the diffuser element 40 will be visualized in the X-ray image. The total diameter 40.1 of the diffuser element 40 is typically between 0.8 and 1.2 mm for PDT applications. Diameters 40.1 of just under 1 mm are common. The decisive factor here is the diameter of the cannula through which the diffuser elements 40 are applied to the patient.

The diffuser base body 43 and the optical waveguide 30 are joined in the conjunction zone 44, for example by a splicing process or a gluing process using a highly transparent, refractive index matched adhesive. During splicing, the optical waveguide 30 and the diffuser base body 43 are softened or melted using a corona discharge and/or a laser, usually a $CO_2$ laser, and are brought together. Depending on the material used for the diffuser base body 43 and for the optical waveguide 30, it may be necessary to use an intermediate medium 45 for matching the thermal expansion coefficients thereof. For example, this may be a solder or transition glass in the case of glass-to-fused silica fusing, or an optical adhesive or putty. Mechanical pressing in the form of a sleeve is also conceivable and advantageous to implement, in which case only the transition is filled by an optical putty to avoid reflection losses. An optical element may also be integrated or connected so as to be disposed in the conjunction zone 44 between the proximal end of the diffuser base body 43 and the distal end of the optical waveguide 30.

FIGS. 3a to 3d show different exemplary embodiments for the arrangement of at least one scattering element 43.6 in a diffuser base body 43. In each case, the diffuser base body 43 comprises a cladding tube 43.3 and a matrix 43.4 in which the scattering elements 43.6 are embedded in a preferred arrangement parallel to the longitudinal axis 43.2 (see FIG. 2) over the entire length of the diffuser base body 43. The axial extent of individual scattering elements may be smaller than the total length of the diffuser base body 43.

FIG. 3a shows an arrangement in which a plurality of scattering elements 43.6 are arranged randomly, more or less evenly distributed over the diameter 43.1 of the diffuser base body 43, that is to say that a plurality of scattering elements 43.6 is provided arranged around the longitudinal axis. The scattering elements are preferably arranged in a regular pattern around the longitudinal axis.

FIG. 3b shows an arrangement in which individual scattering elements 43.6 in particular form an annular array, that is to say that a plurality of scattering elements are provided, which are preferably arranged in a circle around the longitudinal axis.

As an alternative to FIG. 3b, FIG. 3c shows an arrangement in which only one scattering element 43.6 in the form of a tube section is embedded in the matrix 43.4, that is to say that the at least one scattering element 43.6 is arranged tubularly around and in particular coaxially to the longitudinal axis. An advantage of this arrangement is the particularly cost-effective and reproducible manufacturing of the preform of the diffuser base body 43, since the manufacturing process can be considerably simplified in this case.

In principle, other geometries are also conceivable and implementable with advantage for the at least one scattering element 43.6 and/or the arrangement of a plurality of scattering elements 43.6, for example, hexagonal, square, triangular geometries.

FIG. 3d shows an arrangement in which the scattering centers 43.6 are more or less evenly distributed in the matrix 43.4, however not in a core zone 43.7 around the longitudinal axis 43.2 of the diffuser base body 43, which means that the number of scattering elements 43.6 per unit area of the cross-sectional area of the diffuser base body 43 is greater outside a core zone 43.7 than that per unit area within the core zone 43.7, along the longitudinal axis.

This arrangement has the advantage that the laser light which usually only has a small numerical aperture (NA, typically <0.3) will initially, when injected into the diffuser base body 43, be scattered little on the scattering elements 43.6 in the peripheral zone around the core zone 43.7, and will be increasingly scattered only at some distance from the coupling surface 46 (see FIG. 2), when the individual rays reach the scattering elements 43.6 in the peripheral zone. This allows to achieve a reduction in intensity of the laterally emitted light directly downstream of the coupling surface 46 and thus a homogenization of the intensity profile along the diffuser.

In the case of a constant concentration of scattering elements along the longitudinal axis of the diffuser base body, the intensity profile typically exhibits an exponential decay with $I_{(l)}=I_0*e^{-1/k}$. A favorable value for k has been found to be a k corresponding approximately to the length of the diffuser base body (40 mm in the specific example). This leads to approximately a 1/e decay in the emission intensity laterally emitted along the diffuser base body in the operating state, which can be corrected by the further measures such that the aforementioned homogeneity requirements can be met, especially for PDT applications. In a preferred exemplary embodiment, with 21 scattering elements with a diameter of 0.3 mm each as the starting material for the preform and with a matrix diameter of approximately 600 μm (34 mm diameter initial geometry of the preform), a k-value of 42 mm was determined.

FIGS. 4a and 4b schematically show two exemplary embodiments for the structure of the matrix 43.4 in the diffuser base body 43 in a cross section perpendicular to the longitudinal axis of the diffuser base body 43.

FIG. 4a shows an example of a scattering element 43.6 which is embedded in the preform as a thin rod between the matrix elements 43.5 in the form of individual rods. In the illustrated example, the scattering element 43.6 fills the interstices (knuckles) of three individual rods as the matrix elements 43.5. In the illustrated example, individual glass rods with a diameter of 2 mm were used as the matrix elements 43.5 for producing the preform. The scattering elements are made of white glass rods of 0.3 mm in thickness. After the thermal drawing process, i.e. after having been drawn down to the diameter 43.1 of the diffuser base body 43, the scattering element 43.6 will have been bonded by fusing and has a triangular cross section, such as in particular a hyperbolic triangular cross section.

One embodiment of the scattering elements 43.6 in the form of white glass rods or of the white glass tube contemplates that scattering centers are defined therein by scattering particles with a concentration of the scattering particles in the scattering area from 10 ppm to 1000 ppm and preferably from 20 ppm to 100 ppm.

The efficiency of emission from the scattering area, that is from the volume of the white glass of the scattering rods or the white glass tube, depends not only on the scattering property of the scattering particles as an intrinsic parameter, but also on the concentration of the scattering particles in the scattering area itself.

The concentration value in ppm refers to the proportion of the scattering particles in relation to the mass fractions of the white glass components in which the scattering particles are embedded.

If inhomogeneous areas of the white glass are used as the scattering centers, there is an alternative embodiment in which the inhomogeneous areas are preferably defined by phase separation and/or segregation of the glass components of the glass in which they are embedded.

The scattering centers defined by inhomogeneous areas preferably have a diameter from 10 nm to 1000 nm, most preferably from 100 nm to 800 nm.

These scattering centers are most preferably spherical. For non-spherical scattering centers, the diameter refers to the maximum dimension thereof.

The glass referred to as white glass here, in which the inhomogeneous areas are embedded as scattering centers, may preferably consist of a silicate glass containing As and Pb. In this case, the scattering centers preferably have a higher Pb and/or As content than the surrounding glass matrix.

Alternatively, the glass or white glass in which the inhomogeneous areas are embedded as scattering centers may consist of a fluorine-containing Ca—Zn silicate glass. In this case, the scattering centers preferably have an increased fluorine content compared to the surrounding glass matrix.

FIG. 4b shows an alternative arrangement in which the diameters of the scattering elements 43.6 are of the same dimension or smaller than the diameters of the matrix elements 43.5 in the form of individual rods. Here, the typical diameters in the correspondingly assembled preform prior to the drawing process range from 0.5 to 1 mm for the scattering elements 43.6 such as in the form of white glass rods and for the matrix elements 43.5. After the thermal drawing process, that is to say after drawing down to the diameter 43.1 of the diffuser base body 43, the scattering element 43.6 will have been bonded by fusing and has a hexagonal cross section, such as in particular a hyperbolic hexagonal cross section.

The arrangement of the scattering rods in the interstices of the preform allows to achieve a higher number of scattering bodies and thus better homogeneity for a given dimension of the fiber-optic rods and a given cross-sectional fraction. After the drawing process, the matrix elements 43.5 and the scattering elements 43.6 in the form of the diffuser base body 43 may have a circular, hexagonal, square, or triangular cross section, in particular in hyperbolic variants thereof.

As shown in FIGS. 5a and 5b, it may be contemplated for homogenization of the intensity profile that the reflection surface 47 is formed to be concave (FIG. 5a) or convex (FIG. 5b). What can be achieved in this way is that rays propagating almost parallel to the longitudinal axis 43.2 will be reflected back at a steeper angle relative to the longitudinal axis 43.2 and will therefore be scattered more frequently at the scattering elements 43.6, so that the emission efficiency is increased at the distal end of the diffuser element 40.

The reflector surface 47 at the distal end of the diffuser base body 43 may as well be in the form of a hollow and/or transparent body 47.1 with a cover 47.2 reflecting into the cavity and/or into the transparent body, as schematically shown in FIG. 5c. The cover 47.2 may be in the form of a preferably directionally or diffusely reflecting coating and/or cap which may as well directly adjoin the diffuser base body 43, without a cavity, and may in both cases enclose it radially over a short length at the distal end, at least partially or in sections of the circumference thereof.

Thus, the reflector surface 47 is in the form of a concave or convex reflector surface 47 and/or a reflector surface 47 directly adjoining the diffuser base body 43 or defining a cavity between the reflector surface 47 and the distal end of the diffuser base body 43 as a body 47.1 and/or cover 47.2 in the form of a hollow body closed on one end.

In order to achieve further homogenization in view of an intensity profile as constant as possible along the diffuser, further processing steps may be employed, as schematically shown in FIGS. 6a to 6c.

For example, depending on the material used and the material properties of the scattering elements 43.6 and of the matrix 43.4 surrounding them, a gradient heat treatment with temperature loads varying over the length of the diffuser may achieve a continuously varying scattering effect, for example. This allows to adjust, for example, an initially rather low scattering effect directly downstream of the coupling surface 46 and a rather elevated scattering effect at the other end of the diffuser base body 43, that is to say near the reflector surface 47. FIG. 6a schematically illustrates this option. This allows to obtain diffuser base bodies which include scattering elements with scatter centers having a scattering center density per unit volume, which scattering center density is different at the proximal end of the diffuser base body from that at the distal end, preferably with a scattering center density that is greater at the distal end than at the proximal end; most preferably with a gradient in scattering center density.

FIG. 6b shows a "cascade" approach, in which differently produced diffuser portions each featuring a different arrangement and/or density of the scattering elements 43.6 in the matrix 43.4 have been assembled portion by portion to form a diffuser base body, by splicing or glue-bonding using a refractive index matched adhesive, so that the scattering effect of the first diffuser portion where light injection 41 occurs can be designed to be lowest. With appropriate selection of the portions, the scattering effect then increases in the individual diffuser portions in the direction of light propagation in the diffuser base body 43. In this way, homogeneity of the light emitted in the operating state can be consistently maintained within a tolerance band of stepped emission intensity, both axially and radially. Thus, a diffuser base body 43 may be formed from a plurality of portions of different diffuser base bodies.

FIG. 6c shows a further possibility of achieving an intensity profile as constant as possible along the diffuser. The diffuser rods drawn from the preform are formed so as to taper in sections by varying drawing parameters such as rate, temperature, and/or force, and are then cut and processed at the ends. In this way, conically tapering diffuser base bodies 43 are obtained, which due to the taper cause angular spreading of the light rays so that the light travels a greater distance and therefore stronger scattering is caused in the longitudinal direction of the diffuser base body 43. In this case, the scattering elements are still arranged evenly, ideally extending towards a common vanishing point. Thus, a diffuser base body 43 may be formed so as to be conical at least partially or in sections thereof, in which the at least one scattering element 43.6 extends substantially at an angle to the longitudinal axis along the longitudinal axis 43.2 of the diffuser base body 43.

The exponential decay in intensity from the proximal to the distal end of the diffuser base body 43, which usually has to be expected, can be at least partially compensated for with the above examples and/or a combination.

Moreover, as already mentioned above, further subsequent processes are conceivable and can be advantageously implemented, which permit to correct or adjust the intensity profile of lateral emission of the diffuser base body 43 and/or of the diffuser element 40, by structuring the volume and/or surfaces thereof.

FIG. 7 shows a profile plot 100 of different schematic profiles 103, 104, 105 of the intensity 101 of radiation laterally emitted in the operating state, as a function of the distance 102 from the coupling surface.

A first curve 103 shows a typically exponential decay in intensity 101 such as resulting as a solution of a differential equation for a scattering behavior which is homogeneous over the length, i.e. with a constant ratio of injected radiation to scattered radiation over a length section.

By attaching a reflector surface 47 on the distal end of the diffuser base body 43 (see FIG. 2), a portion of the radiation can be reflected back and then provides additional contributions to scattering in particular in the area in front of the reflector surface 47. In mathematical terms, this means an addition of two exponential functions, which corresponds to a second curve 104, which is also illustrated in FIG. 8.

Figure 8:
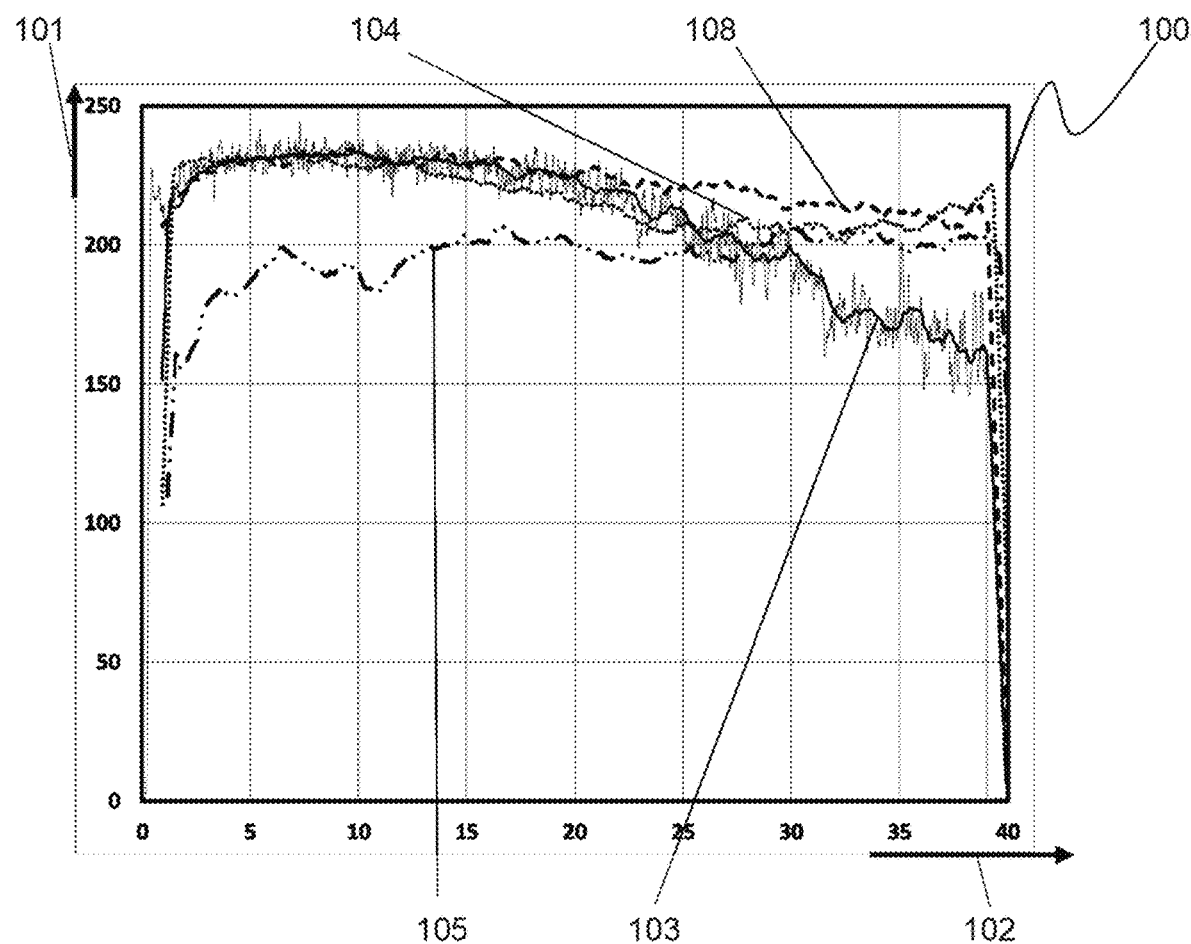
FIG. 8 is a further profile plot showing the measured intensity profiles.

A third curve 105, shown in FIG. 8, represents an intensity profile for a further optimized embodiment of the diffuser base body 43. By geometrically arranging the scattering elements 43.6 such as described in particular in conjunction with FIG. 3*d*, is possible for the profile of intensity 101 near the coupling surface 46, i.e. at the proximal end of the diffuser base body 43, to be adjust so as to be flat or even initially rising within or into the range of intensity tolerance 106, so that overall a comparatively small intensity variation or good homogeneity of lateral emission of the injected light within the range of intensity tolerance 106 can be achieved substantially over the active length 40.2 of the diffuser element 40.

Intensity peaks 107 may nevertheless arise in particular at or close to the coupling surface 46 and also at or close to the reflector surface 47, which can be shielded or minimized, for example by constructive measures such as, for example, sleeves 48 or caps or covers 47.2 as have been described in conjunction and with reference to FIGS. 2 and 5*c*.

FIG. 8 is a further profile plot 100 showing four measured profiles of intensity 101 of the radiation laterally emitted in the operating state, as a function of the distance 102 from the coupling surface. In each case, an optical waveguide 30 with a core diameter 31.1 of approximately 360 µm was used for injection into the diffuser base body 43 which had a diameter of approximately 600 µm. Here, the intensity 101 was determined and is plotted as a gray value intensity, for example of a CCD camera.

Specifically, monochromatic light with a wavelength of 685 nm was used for the measurements in FIG. 8. A Nikon 1V1 camera was used as the camera, and in each case only the red channel output by this camera.

Figure 12:
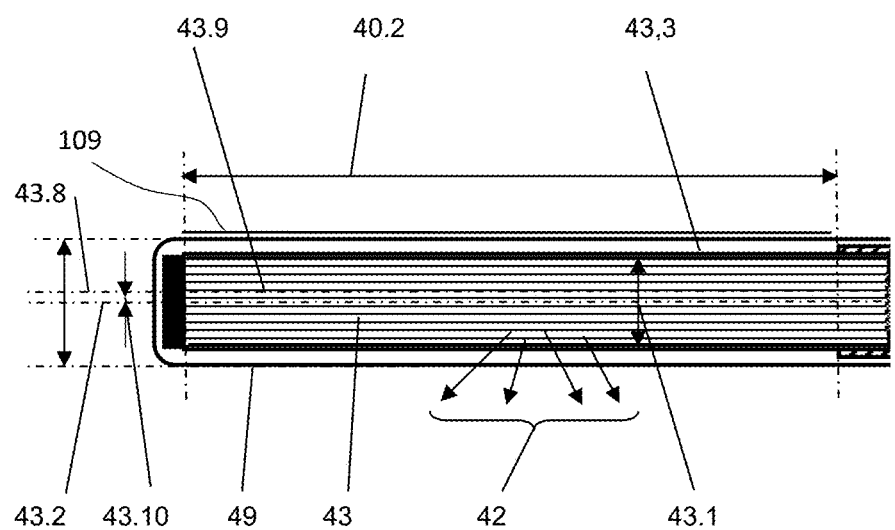
FIG. 12 shows a detail of the schematic cross-sectional view of the diffuser element of FIG. 2.

Measurements were taken along a straight line 109 extending parallel to the longitudinal axis 43.2 of the diffuser base body 43 at the location of light exit, in particular of the scattered light, as shown in FIG. 12. In this measurement, the imaging optical system achieved a resulting local resolution of the measurements of 400 pixels per cm in the direction of this straight line 109. An objective lens with a focal length of 30 mm was used for the imaging optical system which was operated with an aperture of 5.6 in each case.

In physical terms, the intensity or intensity distribution disclosed herein corresponds to luminance, also referred to as brightness, as far as measurements are made using an optical system which captures a fixed solid angle, which was implemented by using the aperture of 5.6 at a fixed focal length of 30 mm.

The distribution shown in FIG. 8 is resulting as the distribution of luminance along the straight line 109 used for this measurement.

However, since relative values between the average lateral emission intensity of the illumination system and a percentage deviation from this average lateral emission intensity are specified for the purposes of the present disclosure, the same percentage deviation is obtained for this specified value if the intensity, luminance, or brightness of a point is measured along the measured straight line 109.

The average lateral emission intensity is based on the mean value of all measured values along the straight line 109. However, the measuring points located at the beginning and at the end of the measured section and at which a sharp drop in intensity is observed, were not included in the determining of this mean value. Specifically, for a measured section of approximately 40 mm in length along the straight line 109, the values from the first and the last 2 mm were not included in the averaging.

The statement that the illumination system in its operating state exhibits an intensity distribution of lateral emission deviating by at most ±50%, preferably by not more than ±30%, and most preferably by not more than ±5% is based on a moving average for this deviation, as will be described in more detail below.

Here, moving average refers to an averaging over ten measured pixels located adjacent to one another on the straight line 109.

Since this averaging is an arithmetic averaging, ten adjacent pixels can be averaged for each pixel and these ten pixels can be laterally shifted by one pixel for the next, laterally adjacent measured pixel to again being arithmetically averaged.

In the illustrated example, the diffuser base body 43 has a length of approximately 40 mm. 21 scattering elements 43.6 are arranged in the diffuser base body 43 in an arrangement according to FIG. 3*d*, and in the preform these scattering elements 43.6 were provided as white glass rods of 0.3 mm thickness and the matrix 43.5 as fiber-optic rods of 2 mm thickness, similarly to the arrangement shown in FIG. 4*a*.

For the sake of clarity, the curves are shown as a moving average, and in the case of curve 103 the raw data are overlaid by way of example.

Figure 9:
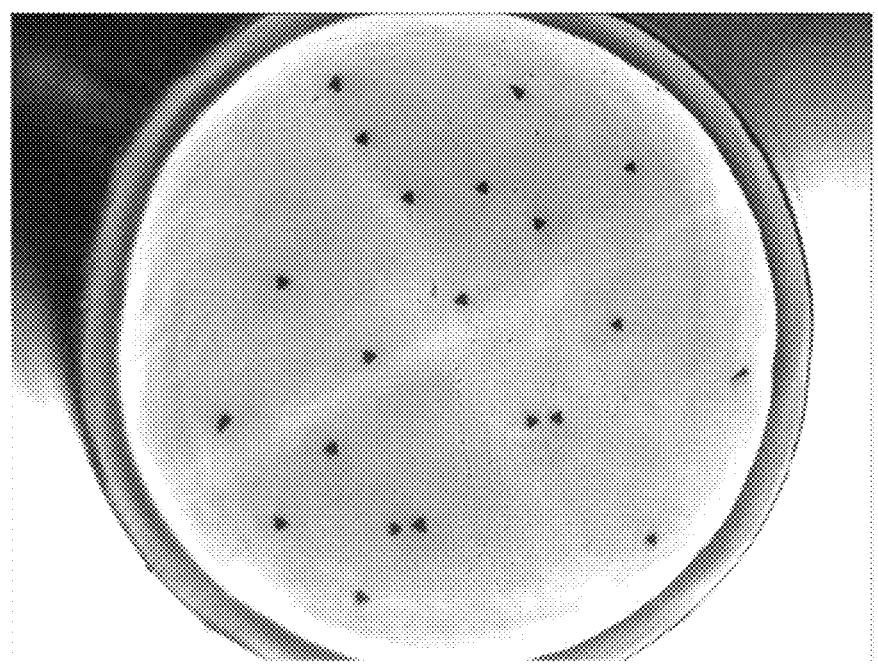

Curve 103 shows the intensity profile without reflector surface 47 for an arrangement of the scattering elements according to FIG. 3*a* and FIG. 9.

Curve 104 shows the intensity profile of a diffuser base body according to FIG. 3*a* and FIG. 9 with a reflector surface 47 in the form of a glue-bonded mirroring film. When the steeply rising initial sections and dropping end sections and thus any optionally present intensity peaks are ignored, an intensity variation of less than ±20% from the average is resulting, without any additional measures.

Curve 108 shows the intensity profile of a diffuser base body according to FIG. 3*a* and FIG. 9 with a reflector surface 47 in the form of a diffusely reflecting white coating. When the steeply rising initial sections and dropping end sections and thus any optionally present intensity peaks are ignored, an intensity variation of less than ±10% from the average is resulting, without any additional measures.

Figure 10:
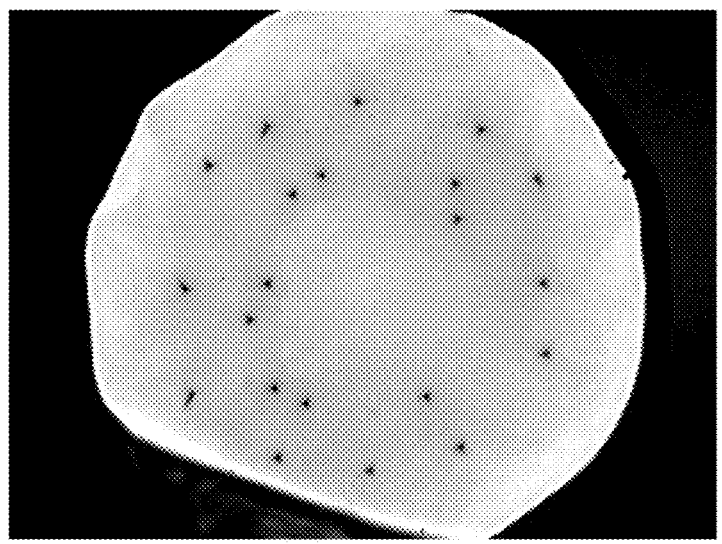
FIG. 10 is a cross-sectional micrograph of a surface of a diffuser base body according to FIG. 3d, prepared only by scoring and breaking.

Curve 105 shows the intensity profile of a diffuser base body according to FIG. 3d and FIG. 10 with a reflector surface 47 in the form of a diffusely reflecting white coating. Moreover, the effect of the arrangement according to FIG. 3d is obvious.

Figure 11:
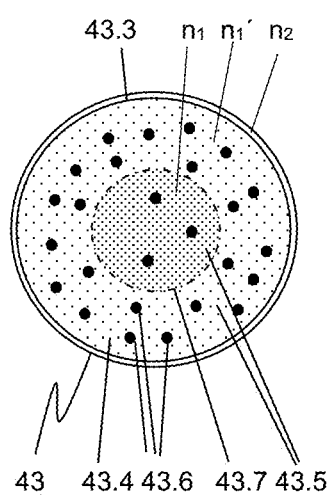
FIG. 11 shows a cross section through a diffuser base body 43 with a matrix 43.4 that has different refractive indices $n_1$ and $n_1$.

FIG. 11 schematically shows a cross section through a diffuser base body 43, in which the diffuser base body 43 with respect to its cross-sectional area has a matrix 43.4 which has refractive indices $n_1$ and $n_1'$ differing between the core zone 43.7 and the peripheral zone of the matrix, in which the scattering elements 43.6 are embedded. This allows to selectively influence the numerical aperture NA in the core zone 43.7 having a matrix refractive index $n_1$ and in the peripheral zone of the matrix having a refractive index $n_1'$, and thus to selectively adapt, to the required emission characteristic, the propagation of light within the diffuser base body 43 and hence the excitation of the scattering centers 43.6 along the length of the diffuser base body 43. Furthermore, any desired cross-sectional geometry of the core zone 43.7 with refractive index $n_1$ can be realized during the manufacturing process, that is to say a substantially circular shape as shown in FIG. 11, or else a polygonal or star-shaped shape. For example, matrix elements 43.5 formed from glass rods with a refractive index $n_1=1.625$ may be used in the core zone 43.7, and matrix elements 43.5 from glass rods with a refractive index $n_1'=1.588$ in the peripheral zone for implementing different numerical apertures in the core zone 43.5 and in the peripheral zone, and in this example the refractive index $n_2$ of the cladding tube 43.3 is equal to 1.49. In the example described, the core zone 43.7 has an NA of 0.35, and the peripheral zone has an NA of 0.55. This allows to influence in a targeted manner the light propagation and thus the excitation of the scattering centers 43.6.

Generally, the at least one scattering element 43.6 is preferably aligned substantially parallel to the longitudinal axis 43.2 of the diffuser base body 43, at least if it is in the form of a white glass rod or white glass tube. This means, as shown in FIG. 12, for example, that the longitudinal axis 43.8 of a white glass rod 43.9 and the longitudinal axis 43.2 of the diffuser base body 43 enclose an angle 43.10 smaller than 1°.

If the at least one scattering element 43.6 is arranged along the longitudinal axis 43.2 of the diffuser base body 43 at an angle 43.10 to the longitudinal axis of the diffuser base body 43, at least when it is in the form of a white glass rod or white glass tube, this means that the longitudinal axis 43.8 of a white glass rod 43.9, as shown in FIG. 12, for example, and the longitudinal axis 43.2 of the diffuser base body 43 encloses an angle 43.10 smaller than 10°.

The same also applies to the longitudinal axis of a white glass tube, not shown in the figures, if the latter defines a scattering element 43.6.

The illumination system of the invention has the advantage that the diffuser elements 40 with the diffuser base bodies 43 can be produced cost-effectively and reproducibly on the one hand, and on the other hand can be made homogeneous with regard to the emission characteristic of the emission intensity laterally emitted in the operating state. In the operating state, the illumination system can have an intensity distribution of lateral emission which deviates from the average lateral emission intensity by not more than ±50%, preferably by not more than ±30%, and most preferably by not more than ±5%. This allows in particular to address applications in the field of PDT. However, applications with higher laser powers such as for EVLT are also possible with these diffuser elements 40.

LIST OF REFERENCE NUMERALS

| | |
|---|---|
| 1 | Illumination system |
| 10 | Laser light source |
| 20 | Connector |
| 30 | Optical waveguide |
| 31 | Core |
| 31.1 | Core diameter or fiber bundle diameter |
| 32 | Cladding |
| 40 | Diffuser element |
| 40.1 | Diameter |
| 40.2 | Active length |
| 41 | Light injection |
| 42 | Light emission |
| 43 | Diffuser base body |
| 43.1 | Diameter |
| 43.2 | Longitudinal axis |
| 43.3 | Cladding tube |
| 43.4 | Matrix |
| 43.5 | Matrix element |
| 43.6 | Scattering element |
| 43.7 | Core zone |
| 43.8 | Longitudinal axis of scattering element, in particular of white glass rod |
| 43.9 | White glass rod |
| 43.10 | Angle |
| 44 | Conjunction zone |
| 45 | Intermediate medium |
| 46 | Coupling surface |
| 47 | Reflector surface |
| 47.1 | Body |
| 47.2 | Reflective cover |
| 48 | Sleeve |
| 49 | Jacket |
| 50 | Tissue |
| 60 | Tumor tissue |
| 100 | Profile plot |
| 101 | Intensity |
| 102 | Distance to coupling surface |
| 103 | $1^{st}$ curve |
| 104 | $2^{nd}$ curve |
| 105 | $3^{rd}$ curve |
| 106 | Intensity tolerance |
| 107 | Intensity peaks |
| 108 | $4^{th}$ curve |
| 109 | Strait line |

What is claimed is:

1. An illumination system, comprising:
    a laser light source;
    an optical waveguide having a proximal end and a distal end, the optical waveguide being in communication with the laser light source at the proximal end thereof;
    a diffuser element at the distal end, the diffuser element having (i) an active length along a longitudinal axis that is perpendicular to a coupling surface of the optical waveguide into or in the diffuser element, wherein the diffuser element, in an operating state, emits light laterally over the active length, (ii) a diffuser base body that includes a scattering element parallel along the longitudinal axis or angled to the longitudinal axis, wherein the scattering element includes scattering centres and (iii) an emission intensity homogenizer,
    wherein the emission intensity homogenizer is disposed at a location selected from a group consisting of at a distal end of the diffuser base body, surrounding a transition area between the optical waveguide and the diffuser base body, at regions of the diffuser base body, and combinations thereof, wherein the illumination system has an intensity distribution, in the operating state, of lateral emission that deviates by at most±50% from average lateral emission intensity, wherein the emission intensity homogenizer is selected from a group consisting of a sleeve, a cover, a cap, and layer at the distal end of the diffuser base body, and wherein the scattering element is at least one scattering element arranged along the entire longitudinal axis with a uniform cross-sectional shape parallel thereto or, or in the case of tapering diffuser base bodies at an angle to the longitudinal axis, the scattering element is at least one scattering element shaped as a tube that is arranged tubularly around and coaxially to the longitudinal axis or the scattering element is a plurality of scattering elements in the form an annular array shaped as a tube that is arranged tubularly around and coaxially to the longitudinal axis, or the scattering element is a plurality of scattering elements arranged in a specific predeterminable geometric arrangement around the longitudinal axis and wherein the diffuser element has a directionally or diffusely reflecting reflector surface terminating the diffuser base body and/or surrounding a lateral surface thereof at least partially or in sections thereof, wherein the reflecting surface has a reflectance of more than 95%.

2. The illumination system of claim 1, wherein the reflector surface has a feature selected from a group consisting of a concave shape, a convex shape, directly adjoining the diffuser base body, and spaced apart from the diffuser base body.

3. The illumination system of claim 1, wherein the intensity distribution deviates by not more than #5% from the average lateral emission intensity.

4. The illumination system of claim 1, wherein the scattering element comprises a plurality of scattering elements around the longitudinal axis.

5. The illumination system of claim 1, wherein the scattering element has a cross section along the longitudinal axis selected from a group consisting of tubular, triangular, hyperbolic triangular, hexagonal, and hyperbolic hexagonal.

6. The illumination system of claim 1, wherein the diffuser base body comprises a matrix having different refractive indices $n_1$ and $n_1'$ along a cross-sectional area.

7. The illumination system of claim 1, wherein the optical waveguide is a single fiber having a core with a core diameter and a cladding, wherein the diffuser base body has a diameter at the coupling surface that is greater than or equal to the core diameter at the coupling surface.

8. The illumination system of claim 1, wherein the optical waveguide comprises a fiber bundle having a fiber bundle diameter, wherein the diffuser base body has a diameter at the coupling surface that is greater than or equal to the fiber bundle diameter at the coupling surface.

9. The illumination system of claim 1, wherein the diffuser element has a directionally or diffusely reflecting reflector surface terminating the diffuser base body and/or surrounding a lateral surface thereof at least partially or in sections thereof.

10. The illumination system of claim 1, further comprising a conjunction zone between the proximal end of the diffuser base body and the distal end of the optical waveguide with an optical element and/or an intermediate medium disposed therein.

11. The illumination system of claim 1, wherein the emission intensity homogenizer surrounds the transition area between the optical waveguide and the diffuser base body.

12. The illumination system of claim 1, wherein the emission intensity homogenizer is disposed at regions of the diffuser base body.

13. The illumination system of claim 1, wherein the emission intensity homogenizer prevents forward emission from the distal end.

14. The illumination system of claim 1, wherein the reflecting surface has a reflectance of more than 99%.

15. The illumination system of claim 1, wherein the reflecting surface is a multi-layer system.

16. The illumination system of claim 15, wherein the reflector surface comprises a surface selected from a group consisting of: sputter-deposited dielectric reflective layers on the distal end of the diffuser base body, vapor-deposited dielectric reflective layers on the distal end of the diffuser base body, and a silver layer with rear passivation.

17. The illuminating system of claim 1, wherein the diffuser base body comprises a transparent matrix selected from a group consisting of transparent plastic, glass, fused silica, transparent glass ceramics, and any combination thereof, wherein, when the transparent matrix is the transparent plastic, the scattering element comprises a material selected from a group consisting a pigmented plastic, a dyed plastic and any combinations thereof, wherein, when the transparent matrix is the glass, the scattering element comprises a material selected from a group consisting pigmented glass or glass ceramic, dyed glass or glass ceramic, inhomogeneities-containing glass or glass ceramic, and any combinations thereof, wherein, when the transparent matrix is the fused silica, the scattering element comprises a material selected from a group consisting of ceramic particles, polycrystalline particles, and any combinations thereof, and wherein, when the transparent matrix is the transparent glass ceramic matrix, the scattering element comprises a material selected from a group consisting of porous glass or glass ceramic, pigmented glass or glass ceramic, dyed glass or glass ceramic, inhomogeneities-containing glass or glass ceramic, and any combinations thereof.

18. The illumination system of claim 1, wherein the intensity distribution deviates by not more than +5% from the average lateral emission intensity.

19. The illumination system of claim 1, wherein the scattering element comprises a plurality of scattering elements around the longitudinal axis.

20. The illumination system of claim 19, wherein the plurality of scattering elements arranged in a regular pattern around the longitudinal axis.

21. The illumination system of claim 19, wherein the plurality of scattering elements arranged in a circular pattern around the longitudinal axis.

22. The illumination system of claim 19, wherein the plurality of scattering elements per unit area, based on a cross-sectional area of the diffuser base body, is greater outside a core zone along the longitudinal axis than within the core zone.

23. The illumination system of claim 1, wherein the scattering element has a cross section along the longitudinal axis selected from a group consisting of tubular, triangular, hyperbolic triangular, hexagonal, and hyperbolic hexagonal.

24. The illumination system of claim 23, wherein the scattering element is arranged coaxially to the longitudinal axis.

25. The illumination system of claim 1, wherein the diffuser base body comprises a matrix having different refractive indices $n_1$ and $n_1'$ along a cross-sectional area.

26. The illumination system of claim 1, wherein the optical waveguide is a single fiber having a core with a core diameter and a cladding, wherein the diffuser base body has a diameter at the coupling surface that is greater than or equal to the core diameter at the coupling surface.

27. The illumination system of claim 26, comprising a ratio of the core diameter to the diameter of the diffuser base body between ≤1.0 and 0.7.

28. The illumination system of claim 1, wherein the optical waveguide comprises a fiber bundle having a fiber bundle diameter, wherein the diffuser base body has a diameter at the coupling surface that is greater than or equal to the fiber bundle diameter at the coupling surface.

29. The illumination system of claim 28, comprising a ratio of the fiber bundle diameter to the diameter of the diffuser base body between ≤1.0 and 0.7.

30. The illumination system of claim 1, wherein the diffuser element has a directionally or diffusely reflecting reflector surface terminating the diffuser base body and/or surrounding a lateral surface thereof at least partially or in sections thereof.

31. The illumination system of claim 30, wherein the reflector surface comprises a surface selected from a group consisting of: polished metallic wire sections disposed in direct contact with the diffuser base body, sputter-deposited dielectric reflective layers on the distal end of the diffuser base body, vapor-deposited dielectric reflective layers on the distal end of the diffuser base body, and a silver layer with rear passivation.

32. The illumination system of claim 31, wherein the reflector surface has a feature selected from a group consisting of a concave shape, a convex shape, directly adjoining the diffuser base body, and spaced apart from the diffuser base body.

33. The illumination system of claim 1, further comprising a conjunction zone between the proximal end of the diffuser base body and the distal end of the optical waveguide with an optical element and/or an intermediate medium disposed therein.

34. The illumination system of claim 33, wherein the conjunction zone is covered by a covering material at least partially or in sections thereof.

35. The illumination system of claim 33, wherein the diffuser base body and the conjunction zone are enclosed at least partially or in sections thereof by a jacket, the jacket being selected from a group consisting of a transparent jacket, a translucent jacket, a colorless jacket, and a dyed jacket.

36. The illumination system of claim 35, wherein the jacket is at least partially made of one or more thin-walled heat-shrink tubes.

37. The illumination system of claim 1, wherein the diffuser base body is made of a material selected from a group consisting of borosilicate glass, phosphate crown glass, lead silicate glass, tin silicate glass, and alkali zinc glass.

38. The illumination system of claim 1, wherein the emission intensity homogenizer surrounds the transition area between the optical waveguide and the diffuser base body.

39. The illumination system of claim 1, wherein the emission intensity homogenizer is disposed at regions of the diffuser base body.

40. The illumination system of claim 1, wherein the emission intensity homogenizer prevents forward emission from the distal end.

41. An illumination system, comprising:
a laser light source;
an optical waveguide having a proximal end and a distal end, the optical waveguide being in communication with the laser light source at the proximal end thereof;
a diffuser element at the distal end, the diffuser element having (i) an active length along a longitudinal axis that is perpendicular to a coupling surface of the optical waveguide into or in the diffuser element, wherein the diffuser element, in an operating state, emits light laterally over the active length, (ii) a diffuser base body that includes a scattering element parallel along the longitudinal axis or angled to the longitudinal axis, wherein the scattering element includes scattering centers and (iii) an emission intensity homogenizer,
wherein the emission intensity homogenizer is disposed at a location selected from a group consisting of at a distal end of the diffuser base body, surrounding a transition area between the optical waveguide and the diffuser base body, at regions of the diffuser base body, and combinations thereof,
wherein the illumination system has an intensity distribution, in the operating state, of lateral emission that deviates by at most±50% from average lateral emission intensity,
wherein the emission intensity homogenizer is selected from a group consisting of a sleeve, a cover, a cap, and layer at the distal end of the diffuser base body, and
wherein the scattering element is at least one scattering element arranged along the entire longitudinal axis with a uniform cross-sectional shape parallel thereto, or in the case of tapering diffuser base bodies at an angle to the longitudinal axis, the scattering element is a plurality of scattering elements that are arranged in a circular pattern around the longitudinal axis,
wherein the diffusor body comprises a transparent matrix in which the scattering particles are embedded,
wherein the scattering elements comprise scattering centers,
wherein, when the transparent matrix is a transparent plastic, the scattering element comprises a material selected from a group consisting of a porous plastic, a pigmented plastic, a dyed plastic and any combinations thereof,
wherein, when the transparent matrix is a glass, the scattering element comprises a material selected from a group consisting of porous glass or glass ceramic, pigmented glass or glass ceramic, dyed glass or glass ceramic, inhomogeneities-containing glass or glass ceramic, crystallites, and any combinations thereof, and
wherein, when the transparent matrix is a transparent glass ceramic, the scattering element comprises a material selected from a group consisting of porous glass or glass ceramic, pigmented glass or glass ceramic, dyed glass or glass ceramic, inhomogeneities-containing glass or glass ceramic, and any combinations thereof.

42. The illuminating system of claim 41, wherein the transparent matrix is a glass comprising the following composition (specified in percent by weight on an oxide basis):

|  | from | to |
|---|---|---|
| $B_2O_3$ | 0 | 24 |
| $SiO_2$ | 23 | 62.1 |
| $Al_2O_3$ | 0 | 10 |
| $Li_2O$ | 0 | 10 |
| $Na_2O$ | 0 | 18.5 |
| $K_2O$ | 0 | 25.7 |
| BaO | 0 | 57.8 |
| ZnO | 0 | 40 |
| $La_2O_3$ | 0 | 25 |
| $ZrO_2$ | 0 | 10 |
| $HfO_2$ | 0 | 14.2 |
| $SnO_2$ | >0 | 2 |
| MgO | 0 | 8 |
| CaO | 0 | 8 |
| SrO | 0 | 24.4 |
| $Ta_2O_5$ | 0 | 22 |
| $Y_2O_3$ | 0 | 11.9 |
| $Rb_2O$ | 0 | 15 |
| $Cs_2O$ | 0 | 21 |
| $GeO_2$ | 0 | 7.5 |
| F | 0 | 2 |
| $\Sigma R_2O$ | 5 | 20 |
| $\Sigma$ MgO, CaO, SrO, ZnO | 20 | 42. |

* * * * *